(12) United States Patent
Mlinarsky et al.

(10) Patent No.: US 7,075,893 B1
(45) Date of Patent: *Jul. 11, 2006

(54) TEST SYSTEM FOR SIMULATING A WIRELESS ENVIRONMENT AND METHOD OF USING SAME

(75) Inventors: Fanny I. Mlinarsky, Bolton, MA (US); Charles R. Wright, Winchester, MA (US); John R. Griesing, Barrington, IL (US)

(73) Assignee: Azimuth Systems, Inc., Acton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/776,413

(22) Filed: Feb. 11, 2004

Related U.S. Application Data

(63) Continuation of application No. 10/379,281, filed on Mar. 4, 2003, now Pat. No. 6,724,730.

(60) Provisional application No. 60/361,572, filed on Mar. 4, 2002.

(51) Int. Cl.
*H04Q 7/24* (2006.01)

(52) U.S. Cl. .................. 370/241; 370/338; 455/423

(58) Field of Classification Search ............... 370/241, 370/242, 252, 243, 244, 245, 250, 328, 329, 370/331, 332, 338; 445/422.1, 423, 432.1, 445/436, 67.11, 67.12, 67.14
See application file for complete search history.

(56) References Cited

U.S. PATENT DOCUMENTS

| | | | |
|---|---|---|---|
| 4,868,716 A | 9/1989 | Taylor et al. ............... 361/424 |
| 4,962,358 A | 10/1990 | Svetanoff .................... 324/627 |
| 5,062,148 A | 10/1991 | Edwards ..................... 455/52 |
| 5,252,782 A | 10/1993 | Cantrell et al. ........... 174/35 R |
| 5,464,393 A * | 11/1995 | Klearman et al. ............ 604/82 |
| 5,465,393 A * | 11/1995 | Frostrom et al. ............ 455/423 |
| 5,566,055 A | 10/1996 | Salvi, Jr. ..................... 361/816 |
| 5,627,834 A | 5/1997 | Han et al. .................... 370/241 |
| 5,794,128 A | 8/1998 | Brockel et al. ............. 455/67.1 |
| 5,805,667 A | 9/1998 | Alvarez et al. .................. 379/1 |
| 5,862,455 A | 1/1999 | Martin et al. .............. 455/67.7 |
| 5,893,031 A | 4/1999 | Hoogerwerf et al. ....... 455/410 |
| 6,052,583 A | 4/2000 | Bernardin ................... 455/423 |
| 6,088,582 A | 7/2000 | Canora et al. ........... 455/226.1 |
| 6,128,474 A * | 10/2000 | Kim et al. ................ 455/67.11 |
| 6,308,064 B1 | 10/2001 | Green ........................ 455/423 |
| 6,308,072 B1 | 10/2001 | Labedz et al. .............. 455/448 |
| 6,314,000 B1 | 11/2001 | Johnson ..................... 361/816 |
| 6,360,621 B1 | 3/2002 | Eldred et al. .............. 73/865.6 |
| 6,385,739 B1 * | 5/2002 | Barton et al. ................. 714/25 |
| 6,438,357 B1 * | 8/2002 | Oh et al. ................. 455/67.14 |
| 6,510,133 B1 * | 1/2003 | Uesugi ....................... 370/208 |
| 6,571,082 B1 | 5/2003 | Rahman et al. ............. 455/67.1 |
| 6,657,214 B1 | 12/2003 | Foegelle et al. .......... 250/506.1 |
| 6,766,164 B1 * | 7/2004 | Funk et al. ................. 455/423 |
| 2002/0041573 A1 * | 4/2002 | Rudolf et al. ............... 370/294 |
| 2002/0084088 A1 * | 7/2002 | Tanaka et al. ................ 174/36 |

* cited by examiner

*Primary Examiner*—Brian Nguyen
(74) *Attorney, Agent, or Firm*—David D. Lowry, Esq.; Brown Rudnick Berlack Israels

(57) ABSTRACT

A method and system for simulating a wireless environment is provided including a central RF combining component; a plurality of connection nodes, each connection node in RF connection with the central RF combining component through a programmable attenuation component; wherein the programmable attenuation components are controlled by a controller console, the controller console maintaining information regarding simulated spatial positioning of the plurality of connection nodes in the simulated wireless environment, and adjusting the programmable attenuation components to appropriately simulate the simulated spatial positioning of the connection nodes in the simulated wireless environment. Additionally, an RF module for creating and receiving RF signals in a test environment is provided.

35 Claims, 22 Drawing Sheets

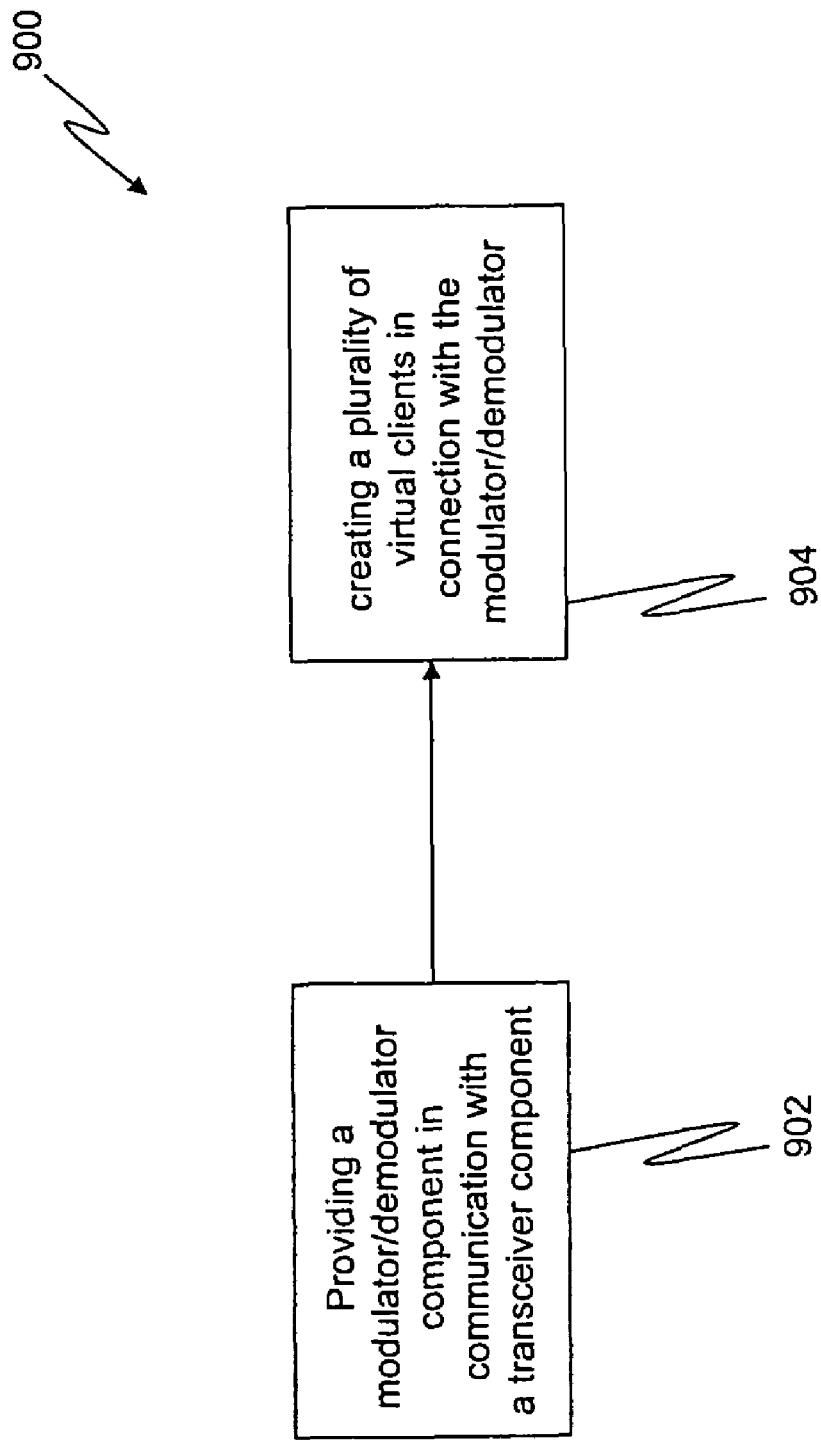

TEST SYSTEM FOR SIMULATING A WIRELESS ENVIRONMENT AND METHOD OF USING SAME

RELATED APPLICATIONS

The present application is a continuation of U.S. Pat. No. 6,724,730 Ser. No. 10/379,281 filed on Mar. 4, 2003 issued on Apr. 20, 2004, the contents of which are hereby incorporated by reference, which claims the benefit of Provisional Application No. 60/361,572, filed Mar. 4, 2002.

FIELD OF THE INVENTION

The present disclosure relates generally to the testing of communication devices and more particularly to a method and system for testing wireless computer network communication devices under various simulated operating conditions.

BACKGROUND OF THE INVENTION

Computer networks are well known and are widely used in a variety of businesses. Currently, there are many different types of wired computer networks available for personal and business use, such as Ethernet, Token-Ring, Gigabit Ethernet, ATM (Asynchronous Transfer Mode), IP, with wired Ethernet being the most popular by far. The emerging Local Area Networks (LANs) are typically based on the IEEE 802.11 standard. Due to the popularity of the Ethernet network, a number of devices and methods were developed to test the Ethernet communication systems. However, as wireless computer network communication systems become less expensive to implement and maintain, they are becoming more prevalent and more widely used to communicate data among nodes of a local area network (LAN). One advantage the wireless network system has over other existing types of network communication systems is the lack of communication wire/cable. Wireless network systems allow for a large number of computer nodes to be communicated together without all of the cumbersome communication wires (such as Ethernet wires) required by non-wireless communication systems and thus provides for a more efficient use of space. Another advantage the wireless network system has over other existing types of network communication systems is that, in buildings which do not already have a wired network infrastructure, wireless systems are much easier and cheaper to implement.

However, unlike with the Ethernet network system, wireless communication networks lack sufficient means and methods for verifying performance, interoperability and compliance with the wireless standards. Although there are many reasons for the lack of testing devices and methods, development on testing devices and methods appeared to be mostly hindered by several factors, including the increased complexity of the wireless communication system as compared to the wired communication system. This increased complexity is a necessary element required to increase the reliability of the wireless system and to achieve a useful level of performance. An additional hindering factor includes the network boundaries. Unlike wired systems, wireless systems have vague network boundaries and thus, the testing of wireless networks require special considerations in order to avoid interference with other wireless systems not involved in the testing procedure. Another factor is that the communication protocols have not matured and are thus in a constant state of flux due to continued standards activity. Lastly, because many wireless equipment manufacturers began by designing and manufacturing traditional wired network systems, they typically lack an expertise with wireless equipment and thus with wireless communications issues.

As such, current methods for testing wireless communications equipment typically range from simply setting up the test in an open air environment to connecting the wireless equipment together via cables, to assembling test setups disposed within radio frequency ("RF") shielded rooms. Although open air test setups have the advantage of being simple to construct, they typically suffer from a variety of problems. First, the open air environment is difficult to control. It is not possible to precisely control signal levels and test topologies in order to verify protocol implementation. Often, due to intermittent interference, specific tests cannot be repeated with consistent results. Second, each test system takes up at least one radio channel and because radio channels are regulated and allotted by the government they are a scarce resource. Thus, an active test lab may use all of the allotted channels for one test setup thereby preventing multiple independent test setups from operating simultaneous and preventing multiple engineers or production workers from working side by side. However, one way to overcome the limitations of the open air test setup is by connecting the test setup to wireless equipment through an RF cable system having RF cables, RF combiners and RF attenuators. Using this approach, transmitter signals can be communicated to the wireless system receivers via the RF cable system. Not only does this allow the signal power levels to be controlled using RF attenuators, but the setup can support flexible network topologies in a controlled environment under repeatable test conditions.

While this may be an improvement over the open air test setup, interference issues are still present. One of these interference issues involves the ability to set up a test system in a small area while allowing other test systems to operate nearby, such as on an adjacent test bench. Unfortunately, because a great number of wireless systems have extremely sensitive receivers in order to operate over a useful range of distances between transmitter and receiver, this is impractical. Flexible cables that are used for these test setups do not provide a sufficient level of RF isolation to allow for more than one interference-free test setup in the same lab. Thus, if multiple test setups are used, signals from the transmitters of one test setup can leak from the cables and infiltrate the receivers of the other test setups, greatly degrading the reliability and validity of the test results.

Although RF shielded rooms can provide for an isolated environment, these rooms are expensive to build and maintain and typically require a substantial amount of space. Additionally, the problem of running multiple test setups in the same shielded room remain because although the shielded room isolates the test setup from RF interference sources located outside of the shielded room, it does not isolate the test setup from RF interference sources within the shield room. Moreover, because of the expense of the shielded rooms, they are typically shared among many engineers who may have different needs for the room. Thus, because assembling and disassembling a test setup may range from many hours to several days, there is an incentive to not change the test setup very often, thus limiting the productivity of the test organization. Furthermore, an additional cost of testing wireless systems includes the purchase of specialized equipment for performing, coordinating, automating and synchronizing the tests. The current art requires that the test system be assembled from commodity components and because these components were most likely not designed to solve the whole problem, the components typically must be integrated into a working system. Once the test system has been assembled, test software typically must be developed in order to automate the testing process and, depending on the complexity of the test setup, a significant effort may be needed to develop the control software. This takes additional time, effort, expertise and represents a significant labor cost.

Moreover, unless tight regulations are developed and maintained, each test setup will be different and because each setup was constructed from components not specifically suited to the job, each component of the test setup can have its own method of programming. As a result of this lack of basic integration, it is very difficult to arrange tests that require coordination of RF transmissions. This whole effort is typically very expensive, time consuming and inefficient for the wireless equipment manufacturers. Moreover, the cost of this setup is further exacerbated by the cost of equipment integration, calibration and customized test software development. Tests that involve overlapping BSSs (Basic Service Sets), roaming and hidden stations are difficult to set up and perform because they typically require flexible control over wireless network topology thus requiring wireless stations and access points to be carried around or wheeled on carts.

Thus, there is a need for a test system that provides a flexible cabled environment for RF testing, wherein the flexible cabled environment allows for flexible topological configurations and wherein the test environment provides a shielded test platform which will allow for close proximity testing of different wireless systems without interference.

SUMMARY OF THE INVENTION

The present disclosure addresses the above-identified need by providing a system for simulating a wireless environment, comprising: a central RF combining component; a plurality of connection nodes, each connection node in RF connection with the central RF combining component through a programmable attenuation component; wherein the programmable attenuation components are controlled by a controller console, the controller console maintaining information regarding simulated spatial positioning of the plurality of connection nodes in the simulated wireless environment, and adjusting the programmable attenuation components to appropriately simulate the simulated spatial positioning of the connection nodes in the simulated wireless environment.

Additionally, an RF module for creating and receiving RF signals in a test environment is provided wherein the RF module includes a data network connection to transmit and receive data over a wired data packet network, at least one mounting surface, to connect a wireless network interface card, the mounting surface including connections so that a mounted wireless network interface card is in RF connection with a programmable attenuation component, wherein the programmable attenuation component is in RF connection with an RF port on the RF module; a controller, interfacing to the data network connection and including connections at the mounting surface, the controller to control a mounted wireless network interface card.

Furthermore, a test module, for simulating traffic in a wireless network is provided and includes a transceiver component, in RF connection with an RF port to the wireless network; a modulator/demodulator component, in communication with the transceiver component; a receive filter and distributor (RFD) component, in communication with the modulator/demodulator component, the RFD component to process data frames received from the wireless network; a transmit arbitrator component, in communication with the modulator/demodulator component, the transmit arbitrator component to process and transmit data frames to the wireless network; an access control unit, in communication with the RFD component and the transmit arbitrator component and at least one virtual client, the virtual client in communication with the RFD component, the transmit arbitrator component, and the access control unit, the virtual client maintaining state information regarding communications in the wireless network.

Also, a method of simulating traffic in a wireless network is provided wherein the method includes providing a modulator/demodulator component in communication with a transceiver component, the transceiver component transmitting and receiving in the wireless network; creating a plurality of virtual clients in connection with the modulator/demodulator, wherein the virtual clients transmit and receive data frames in the wireless network in compliance with a selected wireless communications standard, and wherein the virtual clients maintain individual state for communication protocol as required by the selected wireless communications standard.

BRIEF DESCRIPTION OF THE DRAWINGS

Referring to the exemplary drawings wherein like elements are numbered alike in the several Figures:

FIG. 22 shows a block diagram illustrating a method of simulating traffic in a wireless network.

DETAILED DESCRIPTION OF THE INVENTION

The exemplary embodiments of the test system and methods of operation disclosed herein are discussed in terms of a shielded test platform for close proximity testing of wireless systems under simulated operating conditions. However, it is contemplated that the test system may be utilized as a shielded test platform for various other applications, such as EMC/EMI compliance testing for both intentional and unintentional radiators. The following discussion includes a description of a plurality of possible test system configurations, followed by a description of the method of operating the test system in accordance with the present disclosure. Reference will now be made in detail to the exemplary embodiments of the disclosure, which are illustrated in the accompanying figures.

Currently, wireless systems are tested in an open air environment which does not permit easy reconfiguration of network topology or motion of the devices to enable roaming. As such, it will be appreciated that the test system is based on a system of RF signal combiners and programmable attenuators which are controllable via software to advantageously allow for the simulation of open air transmission. This may be accomplished by adjusting the programmable attenuators to simulate the transmission path loss normally experienced by wireless devices, thus yielding the ability to provide an accurate virtual positioning of devices under test (DUT).

As discussed herein, it is contemplated that multiple test systems may be operated in close proximity to each other by using one or more shielded enclosures to house the wireless devices. This advantageously prevents RF interference between test systems, thus allowing multiple test systems to be operated in the same lab, and even on the same lab bench. It is further contemplated that RF Isolation is also provided between wireless devices in the test system so that the signal level at the receiver inputs may be determined by the programmable attenuators and not by signal leakage. Additionally, it is contemplated that additional infrastructure may be included to provide a common synchronization capability, a control network, the ability to boot selectable OS images over the control network, and a network-attached control PC computer for test setup, orchestration and display of results.

For ease in understanding and because multiple test system configurations are contemplated, a generalized test system will be described followed by a description of each of the components, or possible components, of the test system. Once this has been completed, the preferred embodiments of the test system will be described.

Figure 1:
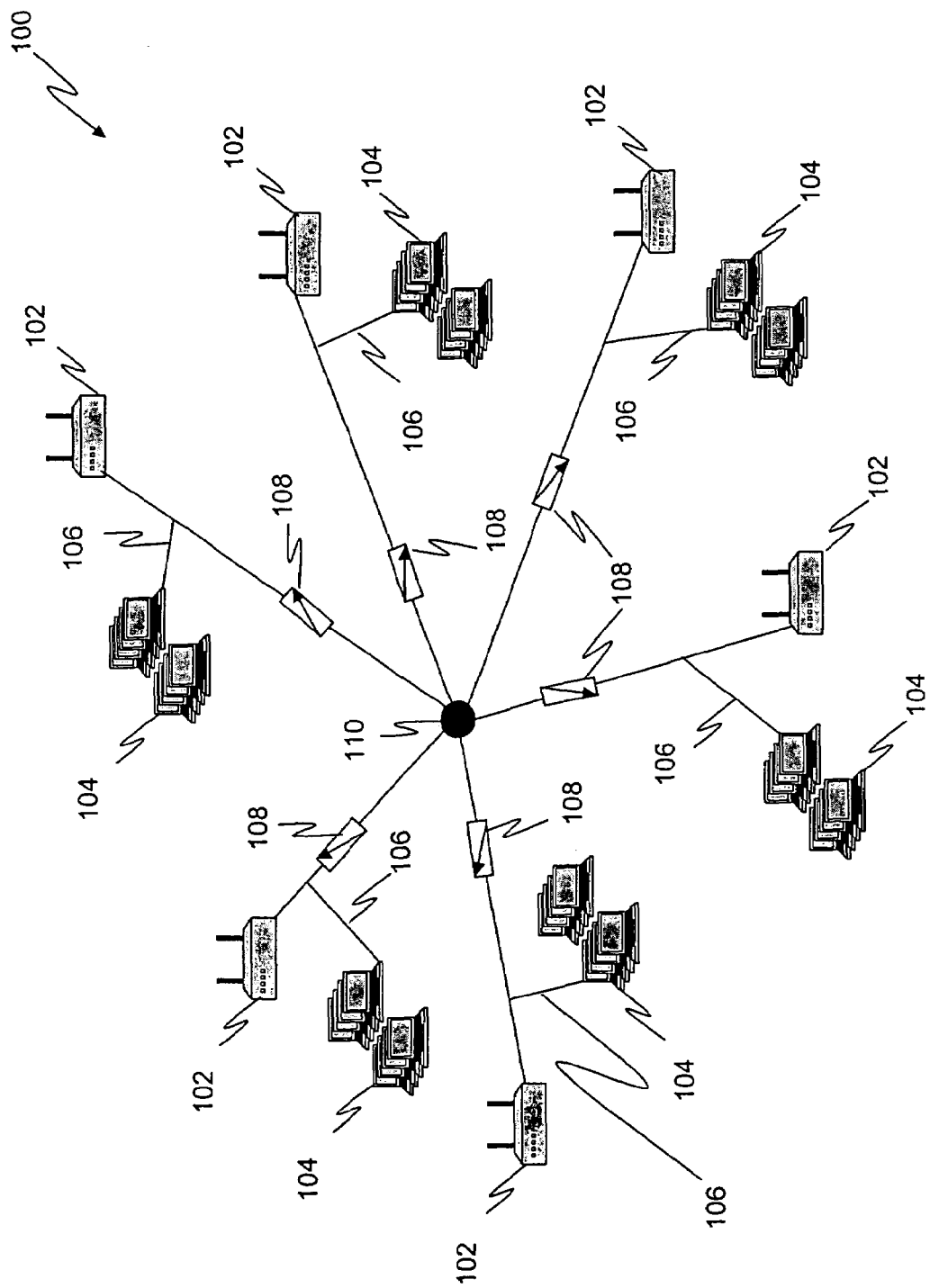
FIG. 1 shows a generalized overall test system environment.

Referring to FIG. 1, a diagram showing a generalized overall view of a test system 100 wireless environment is provided and discussed. Typically, a plurality of Access Points (AP) 102 are provided, wherein each of the AP's 102 are connected to a varying number of associated wireless clients 104 by at least one signal path 106, wherein each of wireless clients 104 may be simultaneously operating on identical or independent frequencies in accordance with the wireless protocols as defined by the IEEE 802.11 standard. Additionally, as shown AP's 102 are connected together via at least one signal path 106 and because the signal path strength in an actual wireless environment may vary in strength due to various propagation factors, test system 100 allows for the simulation of the varying signal path strength via programmable attenuators 108. It is contemplated that programmable attenuators 108 are disposed in each path connected to the center hub 110 and are also used to connect each of the wireless devices to an RF combiner network. The RF combiner network advantageously provides for signal connectivity between all of the attached devices and programmable attenuators 108 advantageously provide the ability to adjust and set signal levels received at each wireless device receiver.

It will be appreciated that test system 100 may be configured in multiple ways such that every wireless device within test system 100 can 'hear' every other wireless device within test system 100, although not necessarily at the same time. Moreover, it will be appreciated that the signal path lengths for one or more of the wireless clients 104 may be lengthened or shortened (to simulate distance between the client device and AP 102) via the appropriate programmable attenuator 108, thus allowing for a 'virtual positioning' capability in order to simulate an actual wireless environment.

As referred to hereinabove, virtual positioning refers to the distance, or signal path length, between a wireless client 104 and an intended receiver/transmitter. The farther a client device is from an intended receiver/transmitter, the longer the signal path length and because signal degradation is directly related to the signal path length, the longer the signal path length, the more degradation the signal will experience. However, this relationship between signal degradation and signal path length advantageously allows for the simulation of variable signal path lengths via adjustment of programmable attenuators 108 disposed within the signal path 106. Thus, an increase or decrease in signal path length, in this case the positioning of a wireless client 104 relative to an RF combiner, may be simulated by changing the values of programmable attenuators 108 disposed within the signal path. Moreover, it is contemplated that virtual positioning of AP 102 may be simulated in this manner as well. It should be noted that one or all of the programmable attenuators 108 may be replaced with a signal processor in order to simulate other open air anomalies, such as signal distortion.

Figure 2:
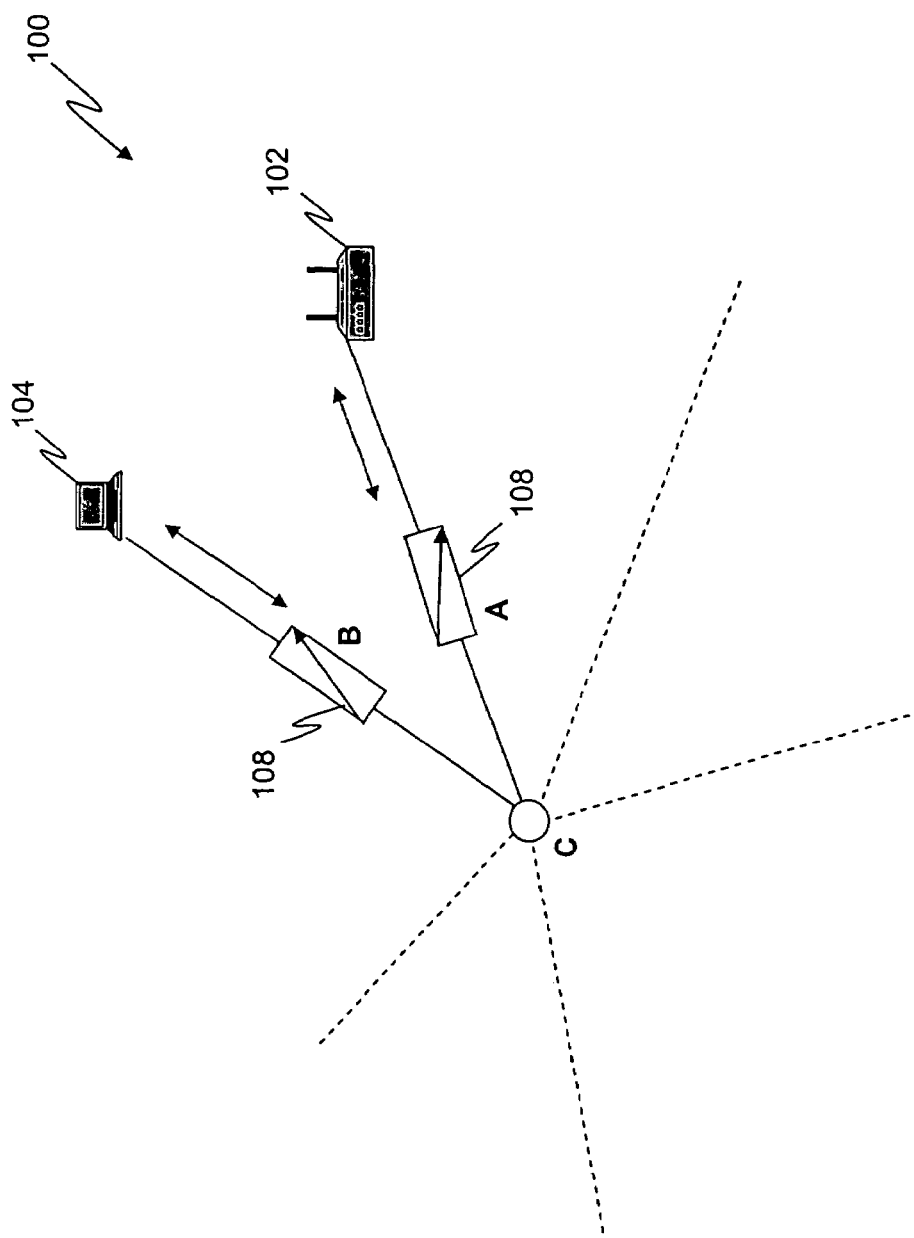
FIG. 2 shows a simulated test system wireless environment.

How virtual positioning is achieved will now be explained with reference to FIG. 2. As can be seen, a diagram of a simulated test system 100 wireless environment is shown and includes a wireless client 104 connected to a central hub via plurality of programmable attenuators 108, wherein the connection from each of the wireless clients 104 carries both the signals transmitted from and received at the particular wireless device. Consider an RF signal transmitted from AP 102 to wireless client 104. As can be seen, upon signal transmission from AP 102, the signal must pass through access point programmable attenuator A through an RF combiner C and through a client programmable attenuator B before being received at wireless client 104. The signal loss experienced by the path traversal may be determined and controlled by programmable attenuators A, B and the RF combiner C and may be adjusted to produce a predetermined received signal level of any desired value. It will be appreciated that, due to the reciprocal nature of the components, the same loss will be experienced by a signal transmitted by wireless client 104 to AP 102, provided the values of programmable attenuators A, B remain unchanged. It will be further appreciated that this is an accurate representation of the reciprocal nature of antennas, transmitters and receivers in a wireless environment.

Figure 3:
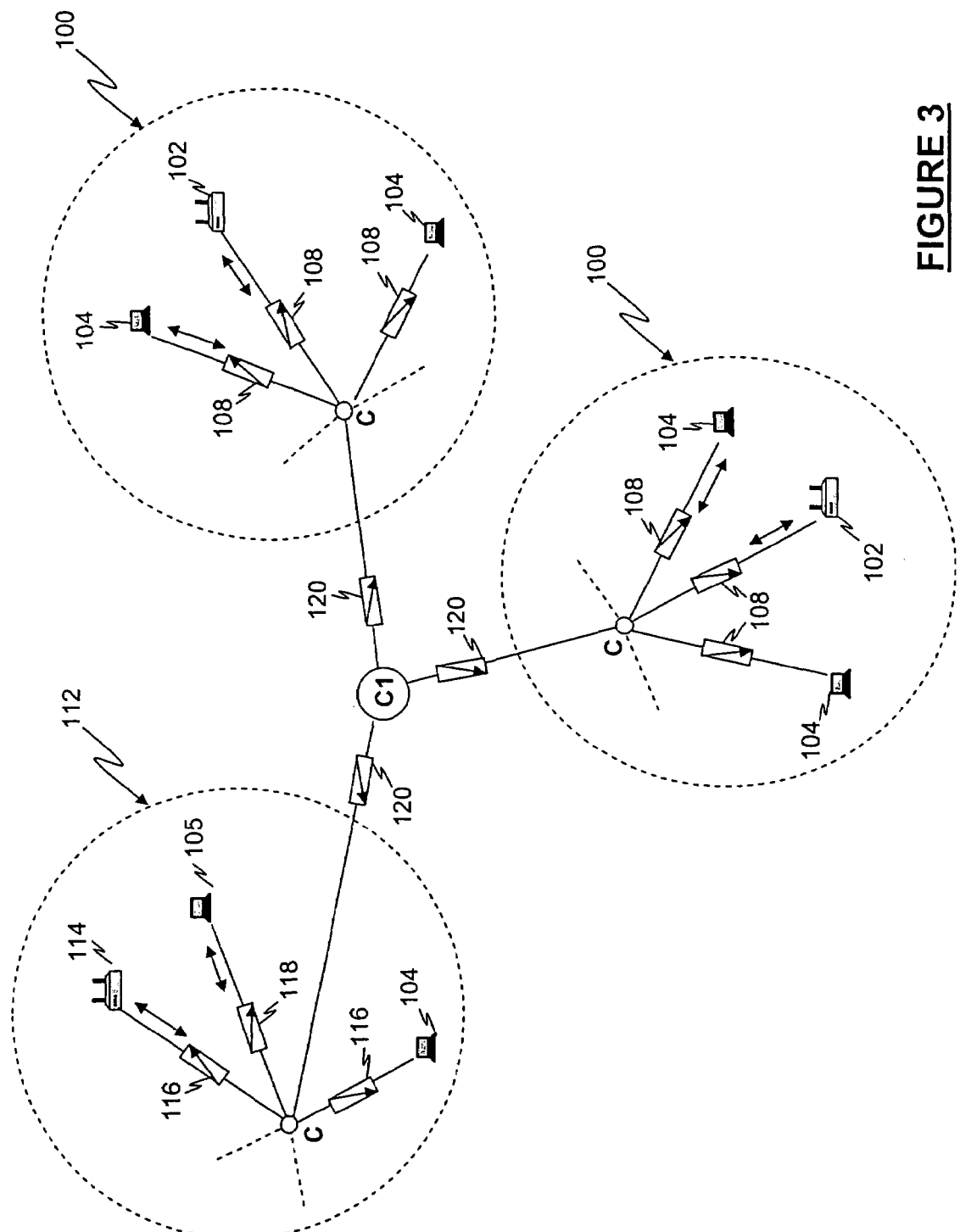
FIG. 3 shows a simulated test system wireless environment having multiple test systems.

Thus, the loss introduced into the signal path by the test system 100 may be increased or decreased simply by adjusting the values of the applicable programmable attenuators 108 and because path loss in a wireless environment is roughly proportional to the physical spacing between the transmitter and receiver, the simulated position of wireless client 104 may be changed relative to AP 102 simply by changing the values of programmable attenuators 108. Moreover, it is contemplated that the concept of virtual positioning may be expanded by hierarchically extending test system 100. This is illustrated in FIG. 3 which shows several test systems 100 connected in a 'star' configuration, wherein an RF combiner hub C1 is disposed in the 'center' of the configuration and wherein each encircled test system 100 represents an individual wireless LAN system or Basic Service Set (BSS) composed of an AP 102 and an arbitrary number of wireless clients 104. Additionally, the RF combiner hub C1 connects to each of these test system 100 through programmable attenuators 108. In a similar manner as the system described in FIG. 2, each wireless LAN system may be 'virtually positioned' by changing the value of the appropriate programmable attenuator 108.

As such, it will be appreciated that test system 100 allows for the simulation of a variety of topology configurations and situations, such as simulation of coverage overlap which exists in real wireless LAN systems. For example, individual wireless LAN systems may be made to 'overlap' in their signal coverage by properly adjusting the values of the programmable attenuators connected to central RF combiner hub C1 in order to achieve the desired amount of signal overlap. This type of simulation may be achieved by setting the values of the programmable attenuators 120 relatively low to permit signals from one simulated wireless LAN 112 (a test system 100) to become detectable by the other test systems 100. Another example may be that a signal from a wireless client 105 may be made to appear stronger in the other test systems 100 than in the one to which it is directly attached. In fact, by increasing the value of programmable attenuators 116 on all other devices 104, 114 in its own test system 112 and decreasing the value of its own programmable attenuator 118 and the programmable attenuators 120 on central RF combiner hub C1, wireless client 114 will appear to have moved from one coverage area to another, thus simulating a roaming wireless client.

Figure 4:
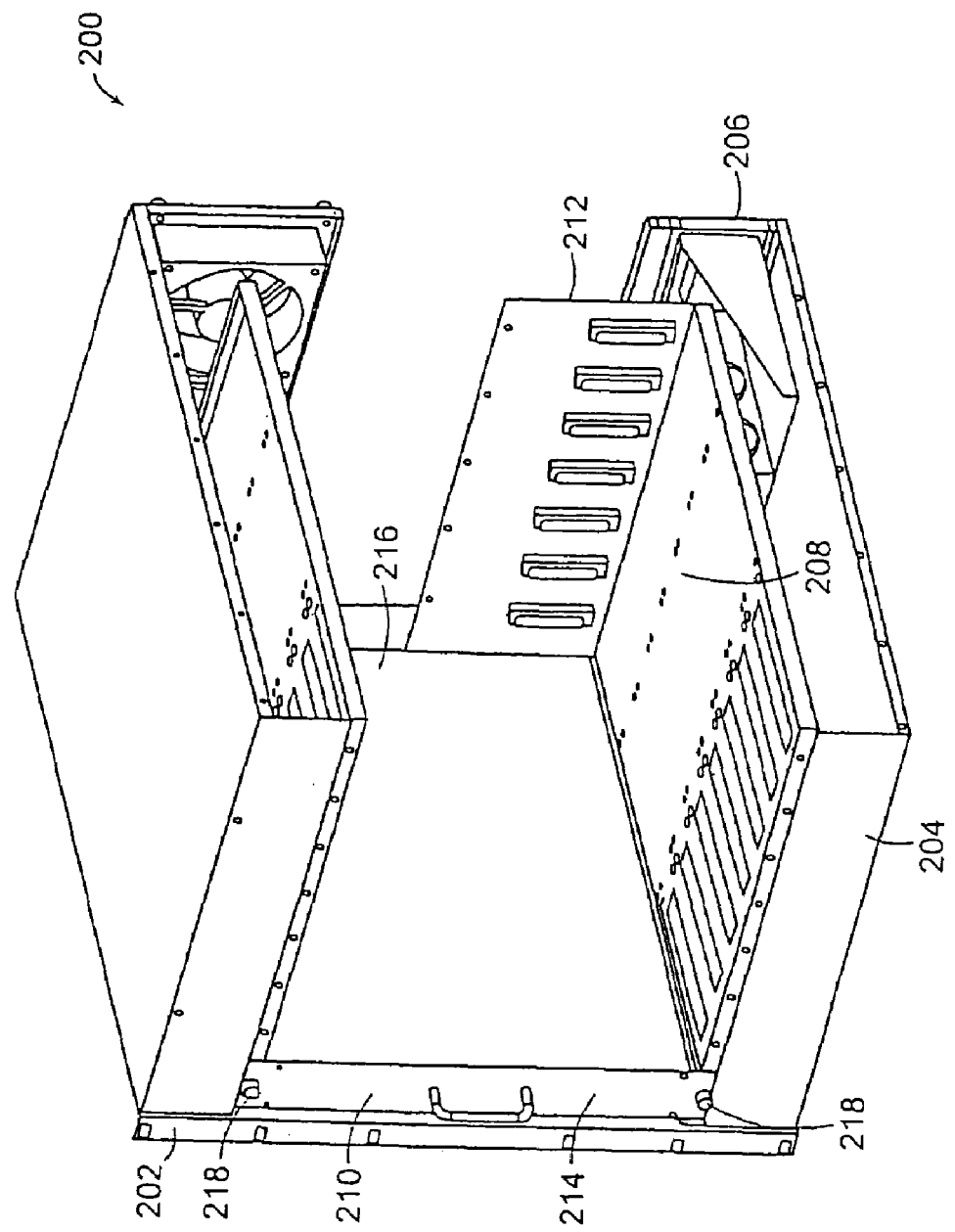
FIG. 4 shows a system chassis.

Referring to FIGS. 4–16, the components of test system 100 are shown and discussed. Turning now to FIG. 4, a system chassis 200 is shown and includes a chassis frame 202 having a front portion 204 and a rear portion 206, wherein system chassis 200 defines a chassis cavity 208 for containing, for instance, a Carrier Module (CM) 210 and a backplane 212. Backplane 212 is disposed within chassis cavity 208 such that backplane 212 is adjacent to and parallel with rear portion 206. It is contemplated that backplane 212 may be non-movably associated with rear portion 206 via any device and/or method suitable to the desired end purpose, such as screws, bolts and/or clips. CM 210 includes a CM front 214 and a CM rear 216 and is disposed within chassis cavity 208 such that CM rear 216 is adjacent to and communicated with backplane 212, as described in further detail hereinbelow. It is also contemplated that CM 210 may be non-movably disposed within chassis cavity 208 by mountingly associating CM front 214 with front portion 204 via a mounting device 218, wherein mounting device 218 may be screws, bolts and/or clips.

Figure 5:
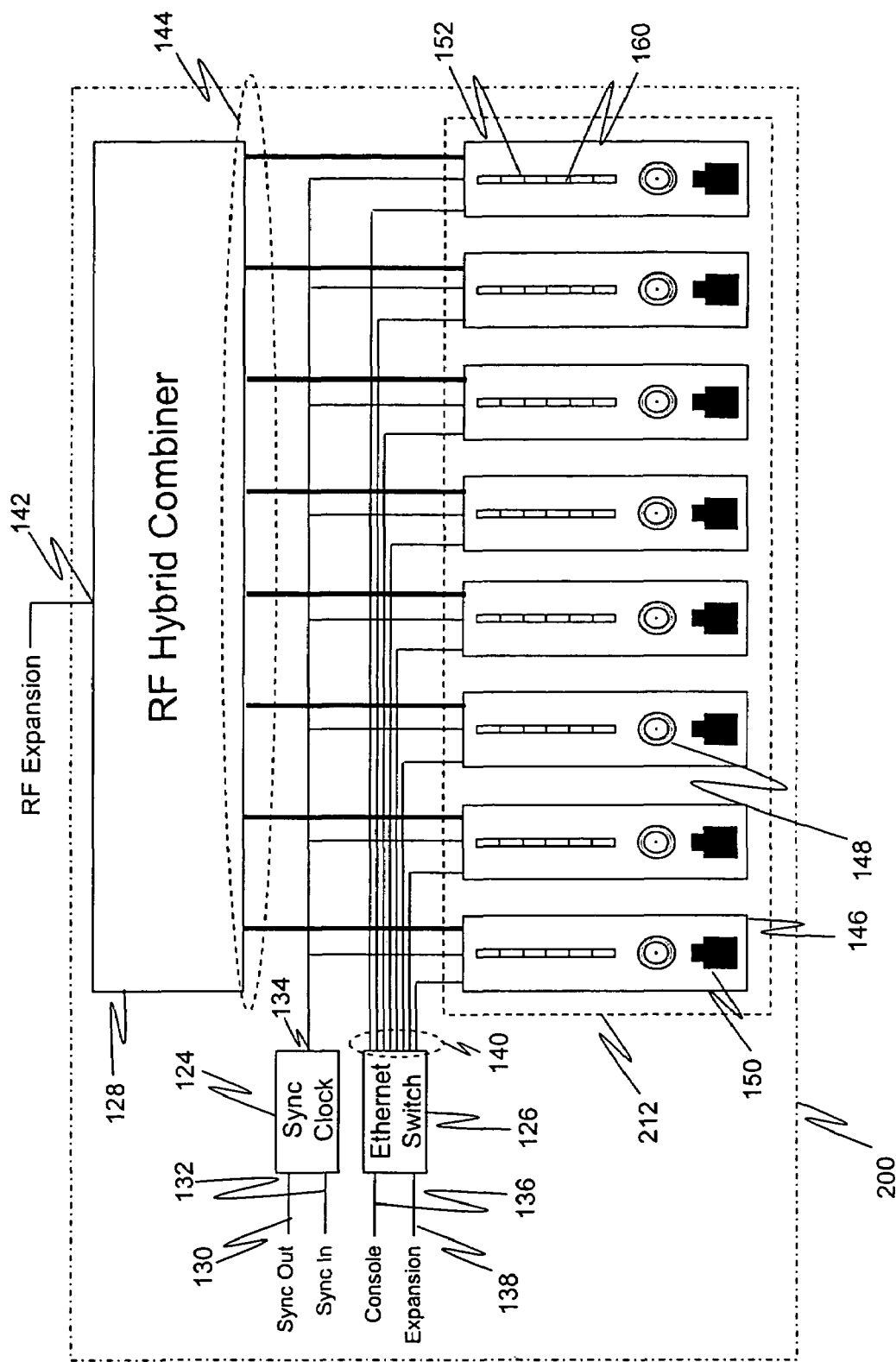
FIG. 5 shows a schematic diagram illustrating the layout and connections between a test system chassis and a backplane.

Referring to FIG. 5, a schematic diagram illustrating the layout and connections between system chassis 200 and backplane 212 is shown. System chassis 200 includes a Sync Clock (SC) 124, an Ethernet switch 126 and an RF combiner 128. SC 124 includes a Sync-Out port 130, a Sync-In port 132 and a Sync-Signal port 134. Ethernet switch 126 includes an Ethernet console port 136, an Ethernet expansion port 138 and a plurality of Ethernet communication ports 140. RF combiner 128 includes an RF expansion port 142 and a plurality of RF signal ports 144. Moreover, backplane 212 includes a plurality of module connectors 146, wherein each of the plurality of module connectors 146 includes a backplane RF port 148 communicated with at least one of the plurality of RF signal ports 144, a backplane Ethernet port 150 communicated with at least one of the plurality of Ethernet communication ports 140 and a backplane Sync-Signal port 152 communicated with Sync-Signal port 134. Additionally, a system power port may be disposed on rear panel and is preferably connected with a power distribution device disposed on backplane 212. The power distribution device is further connected with a plurality of power input ports 160 disposed on each of the module connectors 146 for power distribution to each of the system modules.

It is contemplated that rear portion 206 includes a plurality of connectors which provide an external communication capability with Sync-Out port 130, Sync-In port 132, Ethernet console port 136, Ethernet expansion port 138 and RF expansion port 142. It is further contemplated that each backplane RF port 148 is a blind mate connector which advantageously allows every system module to have an RF connection with RF combiner 128, and hence, the rest of test system 100. Additionally, it will be appreciated that the connection between each backplane Sync-Signal port 152 and Sync-Signal port 134 advantageously allows for the distribution of an identical sync signal to system module, thus allowing for multiple test systems to be synchronized as one.

Test system 100 includes a plurality of components or modules which may be required to simulate desired test environments. These components or modules include CM 210, an Interference Injector Module (IIM) 264, an Inline Channel Simulator Module (ICSM) 284, a TestMAC device 310, an RF Port Module (RFPM) 448, an Interconnection Discovery Device (IDD) 462, a Receive Filter and Distributor (RFD) 318, an Access Control Unit (ACU) 320, a Transmit Arbitrator (TA) 322, a Traffic Source/Sink (TSS) 328, an Interface Unit (IU) 326 and a Distributed Airlink Monitor (DAM). Each of these components or modules are discussed below.

Figure 6:
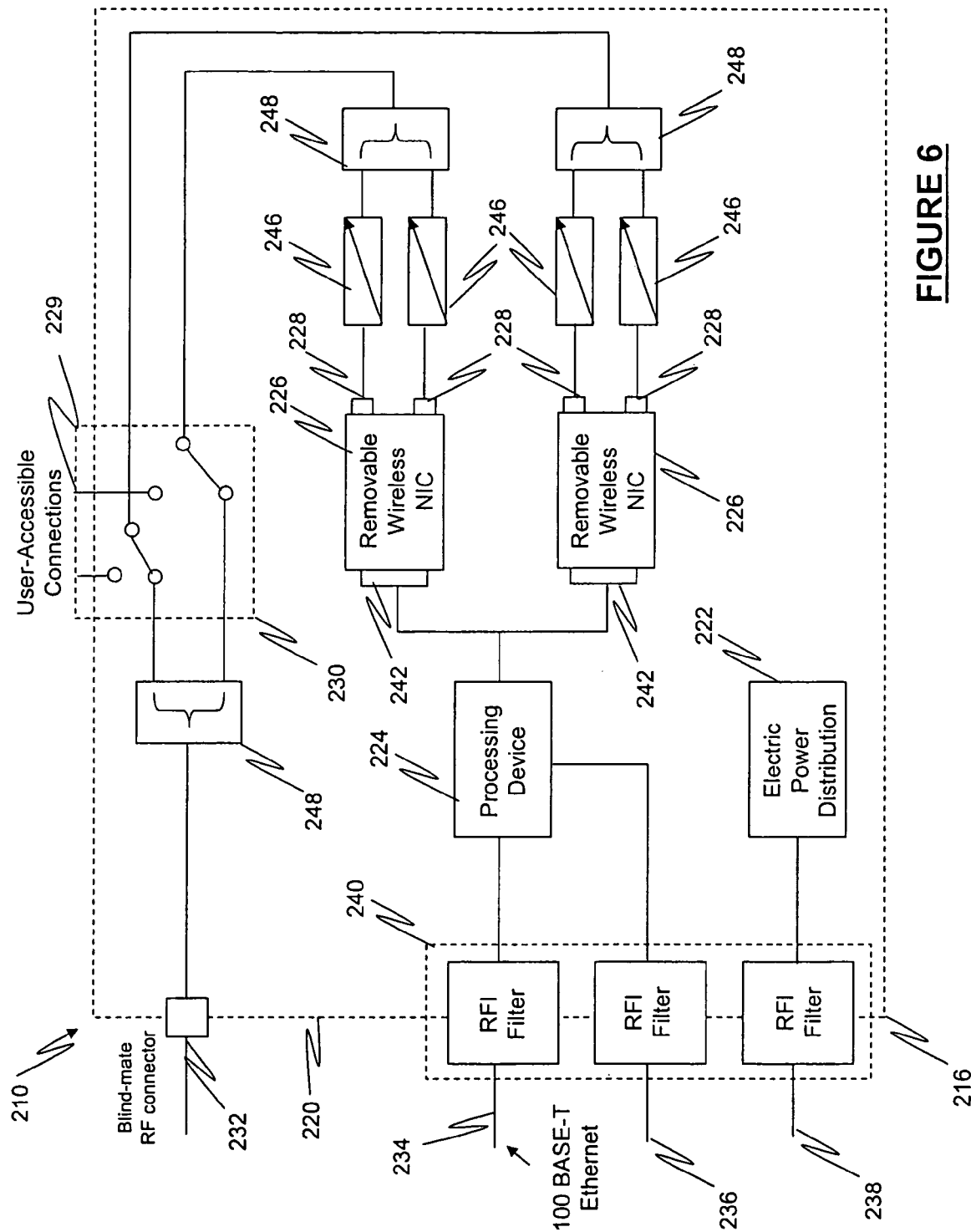
FIG. 6 shows a carrier module.

Turning now to FIG. 6, a block diagram of CM 210 is shown and includes a CM interface connector 220 disposed on CM rear 216, wherein CM interface connector 220 is sized, shaped and configured to easily and connectively interface with at least one of plurality of module connectors 146. CM 210 also includes a CM power distribution device 222 for distributing power to CM 210, a processing device 224, a plurality of wireless Network Interface Controllers (NIC's) 226, a plurality of diversity antenna ports 228 and a plurality of user-accessible connections 229 communicated with a plurality of RF switches 230. CM interface connector 220 includes a CM RF port 232, a CM Ethernet port 234, a CM Sync-Signal port 236 and a CM power port 238, wherein CM power port 238 and CM Ethernet port 234 and CM Sync-Signal port 236 are connected with CM power distribution device 222 and processing device 224, respectively, via a plurality of RFI filtering devices 240. Additionally, processing device 224 is communicated with plurality of NIC's 226 via NIC connectors 242, wherein plurality of NIC's 226 are further connected with CM RF port 232 via NIC diversity antenna ports 228, programmable RF attenuators 246, RF splitter/combiners 248 and plurality of RF switches 230. It will be appreciated that the embodiment of FIG. 6 advantageously allows for the ability to alternate between antennas as well as provides for a virtual positioning adjustment capability via programmable RF attenuators 246 disposed in the RF paths.

Figure 7:
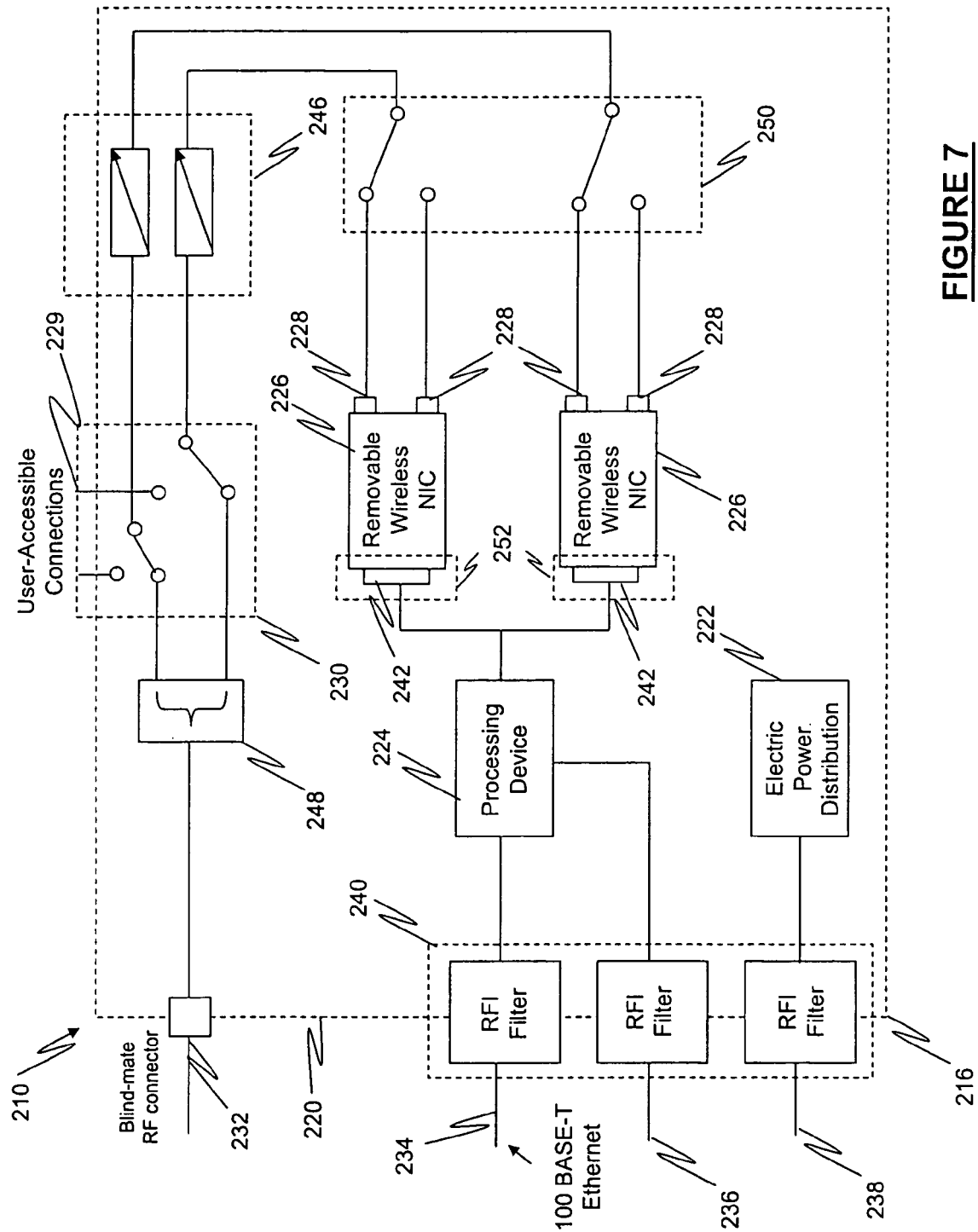
FIG. 7 shows a carrier module, in accordance with an alternative embodiment.

Referring to FIG. 7, a block diagram showing an alternative embodiment of CM 210 is shown and similarly includes a CM interface connector 220 disposed on CM rear 216, a CM power distribution device 222 for distributing power to CM 210, a processing device 224, a plurality of Network Interface Cards (NIC's) 226, a plurality of antenna ports 228 and a plurality of user-accessible connections 229 communicated with a plurality of RF switches 230. As above, CM interface connector 220 includes a CM RF port 232, a CM Ethernet port 234, a CM Sync-Signal port 236 and a CM power port 238, wherein CM power port 238 and CM Ethernet port 234 and CM Sync-Signal port 236 are connected with CM power distribution device 222 and processing device 224, respectively, via a plurality of RFI filtering devices 240. However, processing device 224 is communicated with plurality of NIC's 226 via NIC connectors 242, wherein plurality of NIC's 226 are further connected with CM RF port 232 via NIC diversity antenna ports 228, programmable RF attenuators 246, an RF splitter/combiner 248, RF switches 250, and RF switches 230. It will be appreciated that the alternative embodiment of FIG. 7 not only allows for the ability to alternate between antennas via a switch rather than via an attenuator, but also provides for a virtual positioning adjustment capability via programmable RF attenuators 246 disposed in the RF path. It should be noted that although only one Ethernet port is shown and described, it is contemplated that multiple Ethernet ports may be used It will be appreciated that the primary wireless device in test system 100 is CM 210. It is contemplated that processing device 224 includes an operating system which supports a plurality of plug-in slots 252 for installing wireless LAN NICs 226, wherein the plurality of plug-in slots 252 may be either MiniPCI or PCMCIA connections. Each of the plurality of plug-in slots 252 include a slot diversity antenna port and a slot power port. It is contemplated that NIC's 226 include multiple antenna connections for diversity reception and that CM 210 provides connections to multiple antenna connections 228 through programmable RF attenuators 246, wherein RF switches 250 advantageously allow for diversity reception algorithms in NIC's 226 to be exercised while programmable RF attenuators 246 provide the primary adjustment capability needed to achieve the desired virtual positioning.

It will also be appreciated that user-accessible RF connections 229 advantageously provide for a direct connect capability to NIC's 226 by connecting directly into the RF paths and thus, bypassing RF splitter/combiner 248. It is contemplated that radio signals are communicated between NIC's 226 via CM RF port 232 and that CM Ethernet port 234 is a 100BASE-TX port which provides a control network interface to processing device 224. It is further contemplated that CM 210 may also include an additional 100BASE-TX Ethernet connection, which is connected to a front Ethernet port disposed on the front portion of CM 210 for carrying data traffic into and out of CM 210.

It will also be appreciated that CM 210 is preferably capable of supporting a plurality of operating system's (OS) and running a selection of OS images. This advantageously allows a user to operate a single or a plurality of wireless NIC(s) 226 under any OS for which an OS image exists, such as the Microsoft Windows® OS. It is contemplated that CM 210 obtains its OS image from the Boot Image Server (BIS) which, although is preferably operated on a control PC, may be operated using any PC connected to the control network. It will also be appreciated that the BIS acts in concert with a Boot Manager (BM) running on processing device 224 to load an OS image onto processing device 224. After the OS image is loaded, the BM causes processing device 224 to reboot into the new OS.

It is contemplated that software drivers may be provided for installing off-the-shelf NICs to advantageously allow for a test system capable of supporting volume-produced NIC's from various manufacturers for interoperability testing, development NIC's, and various software tools for configuring the wireless NIC's or for generating and/or analyzing network traffic Additionally, a wireless NIC 226 and software drivers may be supplied for installation into one or both plug-in slots 252 for recording all traffic on the airlink, wherein NIC 226 may have the ability to capture and record all traffic observed on a single radio channel for analysis and/or playback.

It will be appreciated that Interference Injector Module (IIM) 264 may be used to simulate a plurality of interference conditions and may be employed to provide different types of interference to test system 100. IIM 264 is capable of simulating a variety of different interference sources, such as microwave oven, RADAR, cordless phones or other communication systems operating in the same frequency band(s) as wireless NIC's 226. The inclusion of IIM 264 into test system 100 advantageously allows test system 100 to test wireless LAN equipment under a controlled interference environment using a predetermined type of interference in the radiation band of interest.

Figure 8:
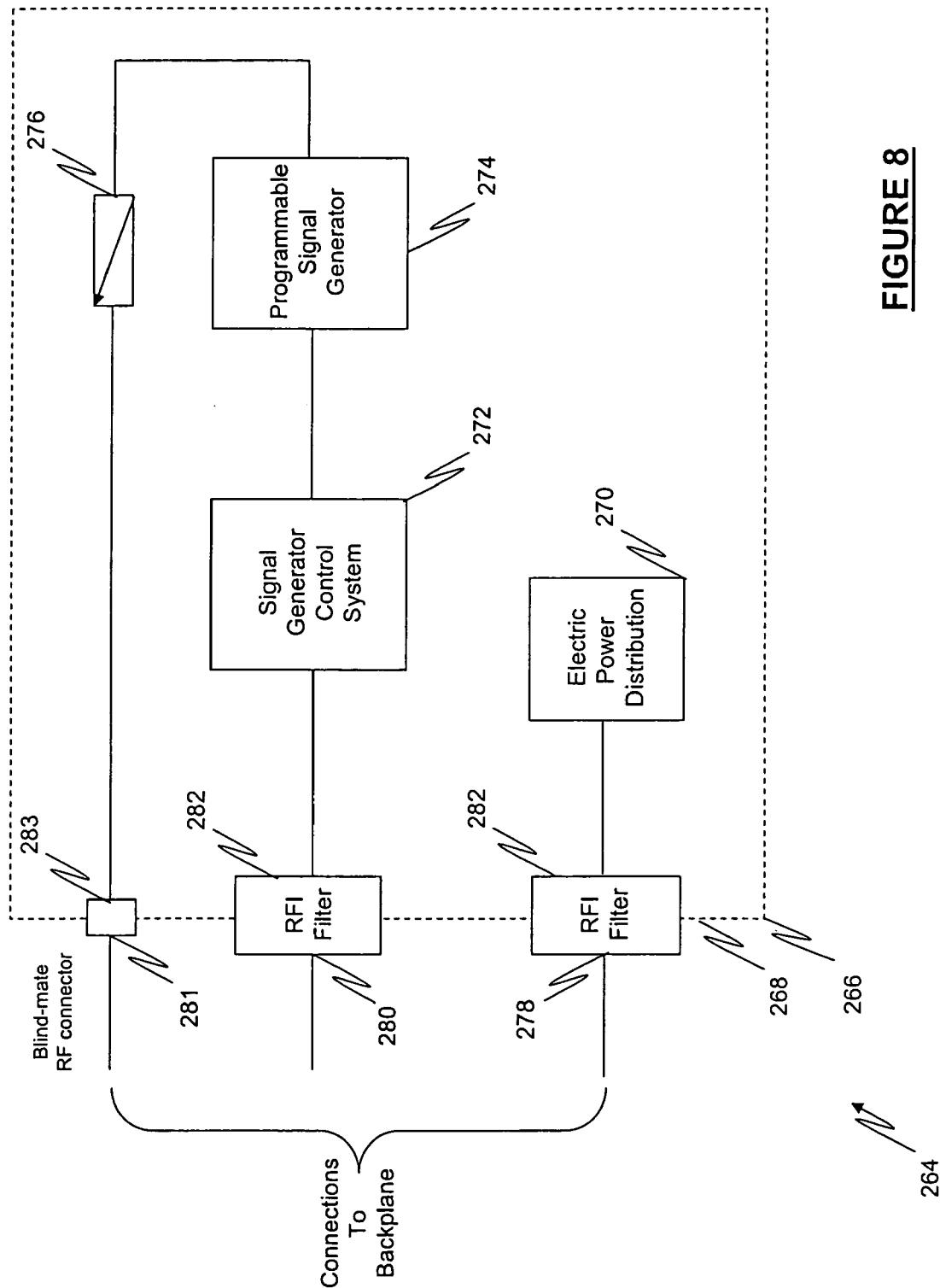
FIG. 8 shows an interference injector module.

Turning now to FIG. 8, Interference Injector Module (IIM) 264 is shown and includes an IIM rear portion 266 having an IIM interface connector 268. IIM 264 also includes an IIM power distribution device 270, an IIM signal generator control system 272, an IIM programmable signal generator 274 and an IIM programmable attenuator 276. IIM interface connector 268 includes an IIM power port 278, an IIM Ethernet port 280 and an IIM RF port 281. IIM power port 278 is communicated with IIM power distribution device 270 via an RFI filter device 282. IIM Ethernet port 280 is communicated with IIM signal generator control system 272 via RFI filter device 282, wherein IIM signal generator control system 272 is further communicated with IIM programmable signal generator 274. IIM RF port 282 is communicated with IIM programmable attenuator 276 via a blind mate RF connector 283, wherein IIM programmable attenuator 276 is also communicated with IIM programmable signal generator 274. Moreover, IIM interface connector 268 is preferably sized, shaped and configured to easily and connectively interface with at least one of plurality of module connectors 146.

Figure 9:
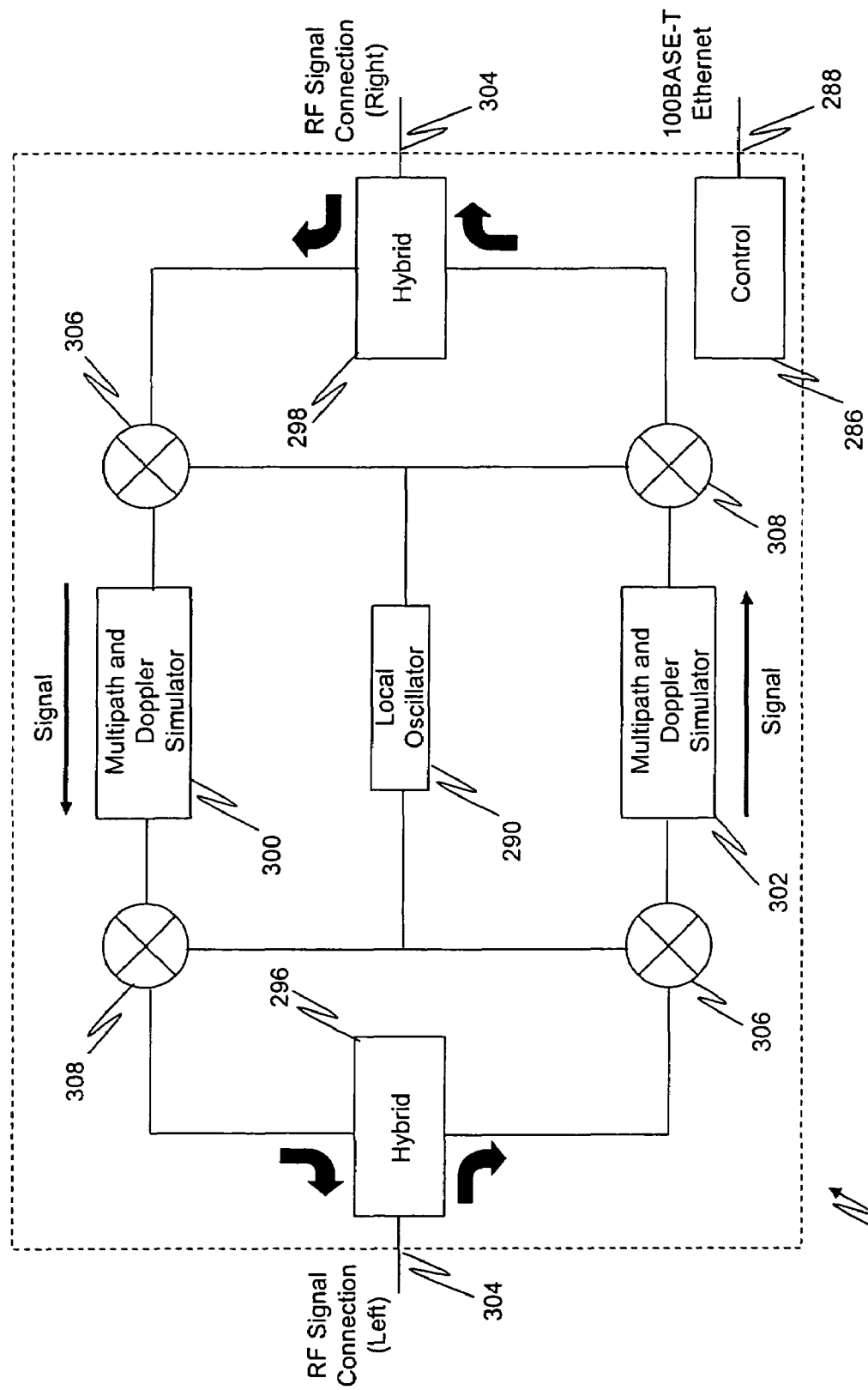
FIG. 9 shows an inline channel simulator module.

Referring to FIG. 9, an Inline Channel Simulator Module (ICSM) 284 is shown and preferably includes an ICSM control device 286 having an ICSM Ethernet port 288 and an ICSM local oscillation device 290. ICSM 284 also includes a first ICSM hybrid signal splitter/combiner 296 and a second ICSM hybrid signal splitter/combiner 298, each of which are communicated with a first Multi-path and Doppler simulator 300 and a second Multi-path and Doppler simulator 302. Additionally, first ICSM hybrid signal splitter/combiner 296 and second ICSM hybrid signal splitter/combiner 298 are communicated with an ICSM RF port 304.

It is contemplated that Inline Channel Simulator Module (ICSM) 284 may be employed to provide a means for simulating signal degradation typically caused by radio propagation phenomena common in wireless environments. It will be appreciated that the cabling in test system 100 carry a plurality of signals which are simultaneously transmitted, or carried, along both directions of the cabling. In order to apply the proper channel simulation to these signals, ICSM 284 separates the signals into a "left signal" and a "right signal" via first ICSM hybrid signal splitter/combiner 296 and second ICSM hybrid signal splitter/combiner 298, respectively. The "left signal" and "right signal" are then communicated to a down-converter device 306 which 'down converts' to a "left baseband signal" and a "right baseband signal" each having a baseband frequency. The "left baseband signal" and "right baseband signal" are then communicated to first Multi-path and Doppler simulator 300 and second Multi-path and Doppler simulator 302, respectively, where simulated channel signal distortion is applied. Once the signal distortion has been imposed upon the "left baseband signal" and the "right baseband signal", the "left baseband signal" and the "right baseband signal" are then communicated to an up-converter device 308 which 'up converts' or restores the "left signal" and the "right signal" signal to its original radio frequency. Upon being 'up converted' the "left signal" and the "right signal" are communicated to ICSM RF port 304 via first ICSM hybrid signal splitter/combiner 296 and second ICSM hybrid signal splitter/combiner 298, respectively.

It will be appreciated that ICSM 284 is a digital signal processing implementation of a channel model as is known in the art and as can be found in the technical literature. It should be noted that test system 100 is wideband, i.e. it is not restricted to passing only the radio channels on which the wireless NICs' are approved to operate. Thus, it is contemplated that wireless devices operating on other than the IEEE 802.11 supported channels may be also be tested in test system 100. Thus, it is contemplated that a variety of general technical methods for simulating Multi-path and Doppler propagation effects may be used, all of which may be implemented using a digital signal processor. Additionally, it is contemplated that a specific tapped delay line model for simulating multipath distortion for wireless LAN systems may also be utilized.

It will be appreciated that a novel part of the TestMAC device 310 relates to its ability to simulate an arbitrary number of wireless clients 104, or virtual clients, with realistic collisions. To create virtual clients 104, very specific modifications to the standard IEEE 802.11 MAC operation must be made and are described below. At a high level, the requirements on the TestMAC device 310 for creating virtual clients 104 are as follows: First, the TestMAC device 310 must send acknowledgement frames on receipt of directed data or management frames, if either of these frame types is addressed to a virtual client simulated by the TestMAC device 310 or a CTS frame on receipt of an RTS frame addressed to a virtual client simulated by the TestMAC device 310. Second, the TestMAC device 310 must provide transmit arbitration (simulation of contention) among all of the virtual clients 104 and use this arbitration to simulate airlink collisions. Third, the TestMAC device 310 must maintain the state of each individual virtual client 104 as if each were independent. This includes, but is not limited to, keeping each individual state in each virtual client 104 for reception of ACKs, retry counts, fragmentation and defragmentation, power save state and/or security parameters. The functions designed to meet these requirements are described as follows.

Figure 10:
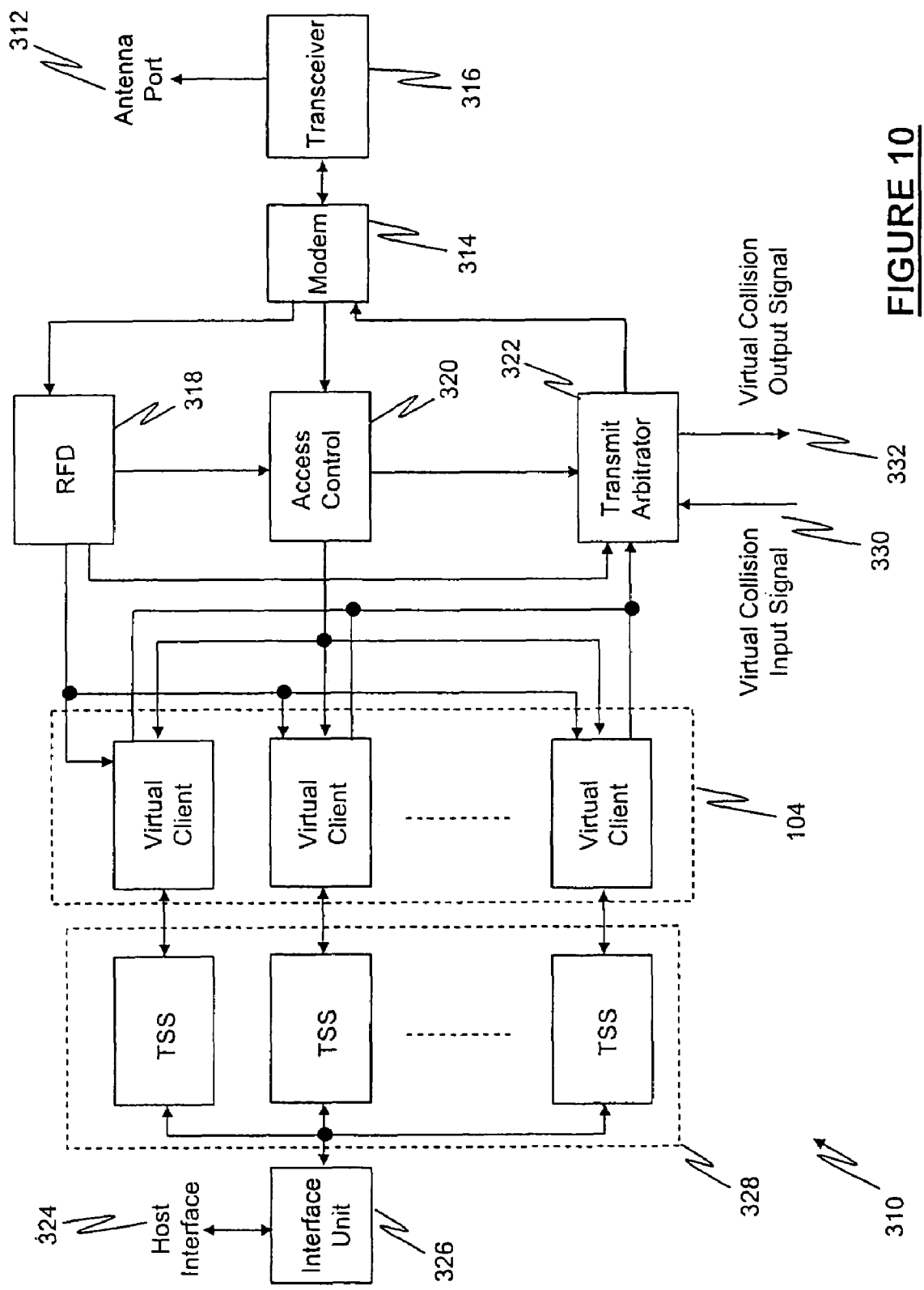
FIG. 10 shows a generalized TestMAC device.

Referring to FIG. 10, a function block diagram of a TestMAC device 310 configured to simulate virtual clients 104 is shown and discussed. The TestMAC device 310 typically includes a TestMAC antenna port 312 communicated with a TestMAC modem 314 via a TestMAC transceiver 316. TestMAC modem 314 is further communicated with a Receiver Filter and Distributer (RFD) 318, an Access Control Unit (ACU) 320 and a Transmit Arbitrator (TA) 322, wherein in TA 322 is communicated with both RFD 318 and ACU 320. Additionally, RFD 318, ACU 320 and TA 322 are further communicated with each virtual client 104, wherein each virtual client 104 is communicated with a host interface 324 via an interface unit 326 and a Traffic Source Sink (TSS) 328. TA 322 also includes a virtual collision signal input port 330 and a virtual collision signal output port 332.

Generally, RFD 318 advantageously processes the header of the received frames and causes an ACK or CTS frame to be transmitted, wherein an ACK frame must be transmitted in response to all frames received for the set of individual addresses TestMAC device 310 is intending to emulate and wherein a CTS frame must be transmitted whenever an RTS frame is received for an address in the set of individual addresses to be emulated by TestMAC device 310. If appropriate, RFD 318 also queues the received frame with the virtual client 104 to which it is addressed (this is the distribution function of RFD 318).

More specifically, upon receipt of a frame, RFD 318 verifies that the frame has a valid frame check sequence (FCS). The FCS is a value which may be computed from the contents of the entire frame, wherein a valid FCS indicates that it is extremely likely the frame was received without errors. RFD 318 then examines all the information in the MAC header of the received frame in order to determine whether the values for the header fields are consistent with the addresses in the frame. Both these operations are standard operations for a commodity IEEE 802.11 MAC.

Each frame includes a field called the Duration Field (DF) which specifies the length of time into the future that the transmitting station expects the airlink to be busy. This advantageously helps avoid the "hidden station" problem, which occurs when some wireless stations do not receive both sides of the transmission between two other stations. This is a typical feature of the IEEE 802.11 standard. RFD 318 determines whether the DF is valid, based on rules described in the IEEE 802.11 standard and, if appropriate, passes the value of the DF to ACU 320. RFD 318 then passes the destination address of the received frame to an address lookup function to determine if the destination address is that of a virtual client 104. If the destination address belongs to one of the virtual clients 104 TestMAC device 310 is emulating, RFD 318 determines whether the frame is one for which an ACK (or CTS) is required. It will be appreciated that under IEEE 802.11, all data and management frames whose destination field specifies an individual wireless client 104 must receive an acknowledgment frame. This is in contrast to addresses that specify a group of wireless clients 104 where frames so addressed are never acknowledged under IEEE 802.11.

It will be appreciated that the address matching function described above is unique to TestMAC device 310 because a standard commodity IEEE 802.11 device only needs to match against a single individual address before making the decision to ACK the frame. Moreover, it should be noted that the ACK decision is one which must happen extremely fast, for example, under IEEE 802.11(a) this can be as short as 2 µs. For this reason, the address matching operation may be distinguished from the matching operation required for frames with group addresses, which, since no ACK is required, do not need such a fast response. Thus, if RFD 318 determines an ACK is indeed required, RFD 318 informs TA 322. Additionally, RFD 318 also queues the frame in the receive queue of the appropriate virtual client 104. In the case of a received RTS frame whose destination address matches one of the virtual clients 104, RFD 318 informs the TA 322 that a CTS frame must be transmitted and indicates to the virtual client 104 that transmitted the RTS that the CTS frame was received.

It will be appreciated that ACU 320 is specialized to support virtual clients 104 and receives inputs from Test-MAC modem 314, RFD 318 and TA 322. TestMAC modem 314 transmits a Clear Channel Assessment (CCA) signal and a Transmit Active (TA) signal, wherein the CCA signal indicates when TestMAC modem 314 is receiving a wireless LAN signal on antenna port 312, and wherein the TA signal indicates when the TestMAC modem 314 a wireless LAN signal on antenna port 312. RFD 318 transmits the value of the DF, which may update the Network Allocation Vector (NAV), as determined by the rules of the protocol, for dissemination to all virtual clients 104. It will be appreciated that this is novel and unique to test system 200 in that a common DF may be part of optimizations that allow the virtual clients to perform only processing unique to their instance. It is contemplated that TA 322 may also transmit a virtual CCA signal which indicates that one of the virtual clients 104 is transmitting (either directly, as e.g. a data frame, or indirectly, as an ACK or CTS frame) data. Each of these inputs affects the determination of whether the channel is busy. Moreover, ACU 320 provides timing information to TA 322 and provides channel status information to each of the virtual clients 104.

TA 322 then determines what frame is transmitted next via the airlink. TA 322 receives inputs from RFD 318, ACU 320 and from each virtual client 104. RFD 318 transmits a signal to indicate whether an ACK or CTS must be transmitted, along with the destination MAC address for these frames. ACU 320 transmits airlink timing information which enables the TA 322 to initiate frame transmissions at the correct time and virtual clients 104 transmit requests to send frames, wherein it is possible that two or more virtual clients 104 may attempt to send a frame simultaneously. There are two possibilities in this case. First, the airlink may already be busy, in which case all virtual clients 104 requesting to send frames must go into a "backoff" mode or second, the airlink may not already be busy in which case TA 322 determines that a virtual collision has occurred between the requesting virtual clients 104, wherein the response may be designed to simulate the effect of an actual airlink collision. TA 322 then transmits a grant signal to all requesting virtual clients 104 and determines which frame would take the longest time to transmit. TA 322 next generates random data to fill a frame to this length and transmits the frame to the TestMAC modem 314 for transmission, wherein the frame check sequence computed for this frame is deliberately made incorrect, thus guaranteeing that any receiving entity will discard the frame as an error.

Additionally, TA 322 transmits a logic signal, via virtual collision signal output port 332, to entities external to TestMAC device 310 indicating that a virtual collision has occurred. These external entities may be another TestMAC device, in which case the second TestMAC device receives the virtual collision signal via virtual collision signal input port 330. The effect of receiving the virtual collision signal is that TA 322 immediately schedules and transmits a random frame of a length no greater than that indicated with the virtual collision input signal. The intent is for two Test MAC devices 310 to transmit at very close to the same time, hence causing a real on-air collision of two simultaneous transmissions. If the second TestMAC is already busy transmitting a frame, then a collision is already certain, so there is no need to transmit a second frame.

It will be appreciated that where multiple TestMAC's may not be possible, real on-air collisions are still possible with the addition of a second transmitter dedicated to responding to the virtual collision output signal. This second transmitter would simply transmit random data of the appropriate duration to cause the real on-air collision. It will also be appreciated that users of TestMAC device 310 may prefer to have a collision which is not certain to be received in error. In that case, instead of sending random data, the actual desired data may be transmitted. If signals from two Test-MAC devices 310 were to collide, the frame for one may be transmitted by the first TestMAC, with the other frame being transmitted by the second TestMAC. It is contemplated that this may be extended to more than two TestMACs.

Virtual clients 104 receives inputs from interface unit 326, RFD 318 and ACU 320. Each virtual client 104 is preferably assigned its own individual 48-bit station address, and implements the remaining functionality necessary to completely simulate a single IEEE 802.11 wireless client 104. This functionality may include, but is not limited to encryption and decryption, fragmentation and defragmentation and functionality of interest normally associated with the IEEE 802.11 MAC sublayer Management Entities, such as Power Management, Timing and Synchronization Function, Authentication and Association management, and channel scanning. It should be noted that interface unit 326 provides a connection with the host system and is preferably a bus-mastering PCI, miniPCI or Cardbus controller, as necessary for the hardware system in which the TestMAC is installed. Interface unit 326 may also be an interface to Ethernet, if appropriate in the system, without any loss of functionality.

As such, when virtual client 104 wants to transmit a frame, virtual client 104 checks the channel status indicator in ACU 320 in order to determine if the channel is free. If the channel is busy, several scenarios are possible. First, when the physical airlink has been clear for a DIFS period or longer, the virtual client 104 will attempt to send the frame to TA 322. Second, the physical airlink may be busy with a transmission from another physical device, in which case, a grant is denied. The virtual client 104 must then enter a "backoff" mode, wherein each virtual client 104 maintains its own "backoff" counter. Third, the airlink may be busy because one or more of the other virtual clients 104 is transmitting, wherein a grant to transmit is denied and virtual client 104 must enter into a 'backoff' mode, or fourth, two or more virtual clients 104 are attempting to access the channel at once. It is the job of TA 322 to detect this situation. RFD 318 provides the distribution function for frames sent to a particular virtual client 104, wherein data and management frames are queued based on the destination MAC address. Control frames or indications of a received control frame are also passed to the appropriate virtual client 104.

TSS 328 is provided in order to generate and analyze traffic. It is contemplated that TSS 328 may be implemented using any device and/or method suitable to the desired end purpose, such as software and/or hardware (ASIC, FPGA, firmware) As a traffic source, it may send traffic to one or more virtual clients 104 to which it is directly connected, or it may send traffic to the interface unit 326. In the former case, the frame will be passed to a virtual client 104 based on the source TestMAC device 310 address, wherein virtual client 104 may attempt to transmit it over the RF network. The frame is received by an AP device under test 102 through the RF network and relayed to the Ethernet-connected part of test system 100. It arrives at the host to which TestMAC device 310 is connected, is passed to interface unit 326 and received at TSS 328 from which it originated. This is known as egress traffic, wherein the traffic leaves a wireless network through AP 102. For ingress traffic, the traffic path is the reverse of the egress path. However, in both cases once frames arrive back at the TSS 328, various statistical measures are computed depending on the test that was being run. Moreover, TSS 328 may also act as a pass-through, allowing test frames to enter TestMAC device 310 from another source.

When hosted under a Windows® operating system, TSS 328 provides an Applications Programming Interface (API) to the operating system to allow each virtual client 104 to be accessed as if it were a separate network interface. This advantageously allows programs written for the Windows operating system to send and receive traffic over virtual clients 104. A further use of the API to each virtual client 104 is to allow packet bridging through the PC host to an Ethernet interface. This advantageously allows communication with the control network, or test traffic transmission and reception from the test network.

It will be appreciated that TestMAC device 310 may be employed to simulate a variety of operational conditions. TestMAC device 310 is preferably a programmable wireless transceiver capable of operating as a selectable number of standards-compliant wireless clients 104, as a system capable of violating existing Medium Access Control (MAC) protocols in controllable and predetermined ways or as a wireless AP 102. It is contemplated that TestMAC device 310 is also capable of recording and precise time-stamping of all signal traffic transmitted and received over the air for later playback and/or analysis. Moreover, although TestMAC device 310 is described and discussed herein as being used as a module in test system 100, TestMAC device 310 may be employed for field test purposes as a stand-alone component.

It will be appreciated that for testing an access point's ability to handle traffic from a service area, a single wireless station typically does not provide a realistic stress scenario. As such, TestMAC device 310 is capable of simulating a scenario where multiple wireless clients 104 are competing for access to the wireless network simultaneously. This capability advantageously eliminates the need to have multiple wireless clients 104, each attached to a computer, thus reducing the cost and space requirements. It will also be appreciated that 'positive testing', or testing of wireless NIC's 226 against another wireless NIC's 226 known to properly adhere to MAC protocol is typically not sufficient to fully exercise the operational capabilities of the wireless NIC's 226, as it can be seen that this type of testing ignores situations where MAC protocol is violated. As such, TestMAC device 310 advantageously allows for 'negative testing', in which deliberate violations of the MAC protocol are generated for the purpose of determining whether the wireless NIC's 226 under test are able to properly handle and ignore such violations and not become trapped in an undefined operational state.

Figure 11:
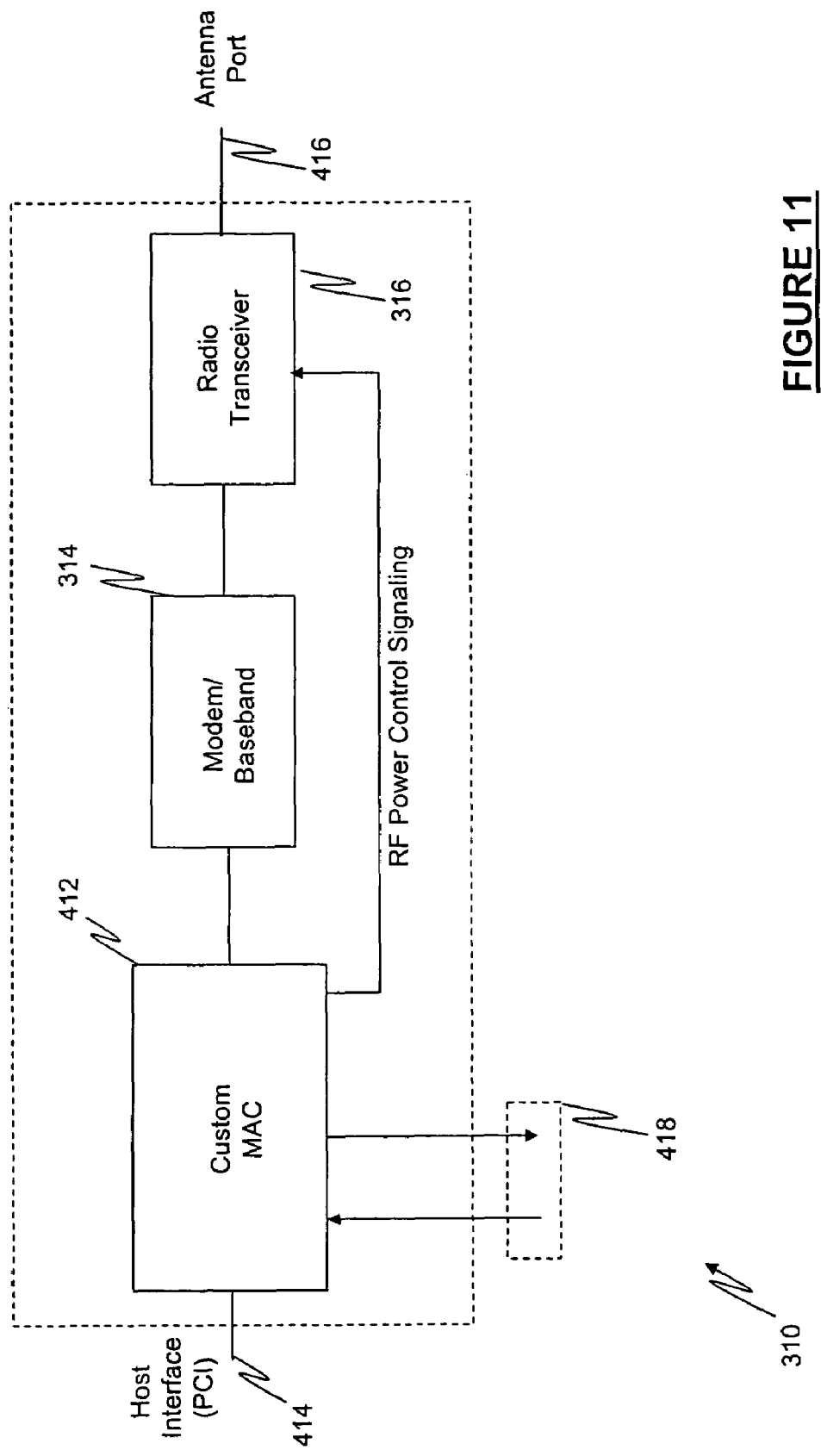
FIG. 11 shows a TestMAC device.
Figure 12:
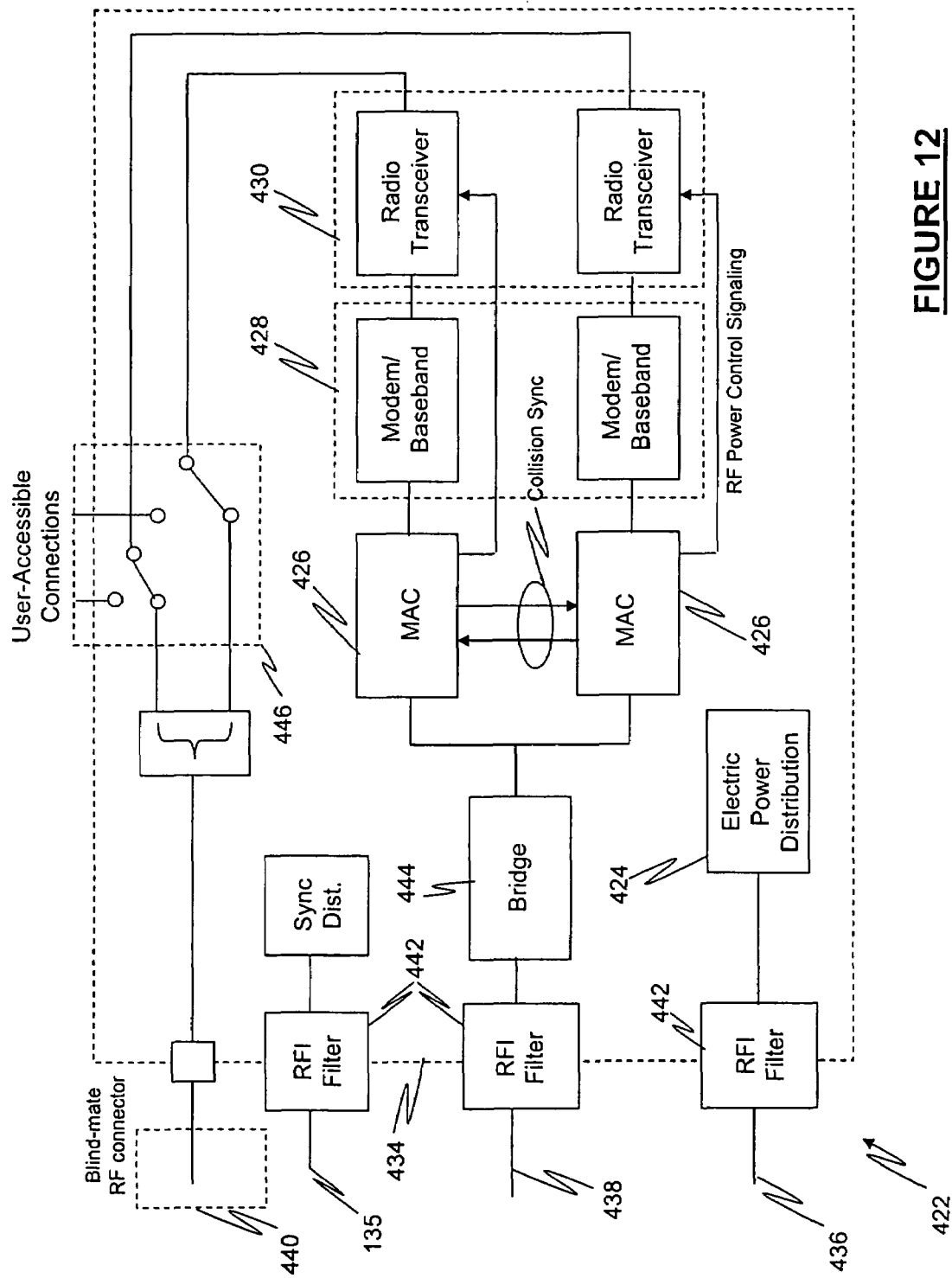
FIG. 12 shows a TestMAC device configured as a TestMAC module.

Referring to FIGS. 11 and 12, a functional block diagram of TestMAC device 310 and a functional block diagram of TestMAC device 310 being implemented as a TestMAC module 422, respectively, are shown and discussed hereinbelow. Additionally, it should be noted that although TestMAC device 310 is described herein as being implemented as a NIC version of TestMAC device 310 and as a TestMAC module 422, a module version of TestMAC device 310, it will be appreciated that TestMAC device 310 may be implemented in various other ways and is not meant to be limited to the description contained herein.

Turning now to FIG. 11, a functional block diagram of TestMAC device 310 being implemented as a NIC version of TestMAC 310 is shown and discussed. In this implementation, TestMAC device 310 includes a Custom MAC 412 communicated with TestMAC modem/baseband 314 which is further communicated with TestMAC Transceiver 316. Custom MAC 412 is designed to be plugged into plug-in slot 252 of CM 210, wherein plug-slot 252 is preferably a miniPCI plug-in slot. As such, TestMAC device 310 preferably includes a TestMAC miniPCI interface connector 414, a TestMAC antenna port 416 and a TestMAC collision sync input/output port 418, wherein TestMAC miniPCI interface connector 414 and TestMAC antenna port 416 connect to CM 210 in the usual way and wherein collision sync input/output signals are provided to test system 100 via TestMAC collision sync input/output port 418. The collision sync input/output signals required to simulate realistic collisions are described in more detail below. It is contemplated that when multiple TestMAC devices 310 are installed in CM 210, connections in CM 210 pass the signals between the multiple TestMAC devices 310. However, when regular wireless LAN NICs 226 are installed in CM 210, these connections in CM 210 are typically unused. It will be appreciated that alternative methods of communicating sync signals between multiple TestMAC devices 310 exist and include the use of messages communicated via the host interface.

Moreover, TestMAC device 310 includes a TestMAC programmable attenuator 420 connected in series with TestMAC diversity antenna ports 416, wherein TestMAC programmable attenuator 420 controls the RF power at which each signal frame is transmitted, thus allowing TestMAC device 310 to simulate the virtual position of multiple wireless clients 104. It will be appreciated that TestMAC device 310 advantageously includes the capability to control both signal transmit power and signal receive power thus providing virtual positioning for each Virtual Client (VC), whereas current off-the-shelf wireless LAN NICs only provide power adjustment capability for signal transmit power.

In another embodiment, multiple TestMAC devices 310 may be implemented in a single plug-in module for installation into test system 100. It will be appreciated that for this configuration Ethernet replaces the host PCI interface of TestMAC device 310. Moreover, collision sync signaling is provided directly without the need for a signal that leaves the module. Additionally, RF power control signaling is provided in the same manner as in TestMAC device 310 and both user-accessible and blind-mate backplane connections are provided for easy integration with test system 100.

Referring to FIG. 12, a functional block diagram of TestMAC module 422 is shown and discussed. TestMAC module 422 includes a TestMAC electric power distribution device 424, a plurality of Custom MAC devices 426, a plurality of TestMAC Modem/Baseband devices 428, a plurality of TestMAC radio transceivers 430 and a TestMAC rear portion having a TestMAC interface connector 434.

TestMAC interface connector 434 includes a TestMAC power port 436, a TestMAC Ethernet port 438, a TestMAC Sync-Signal port 135 and a plurality of TestMAC RF ports 440, wherein TestMAC power port 436 is communicated with TestMAC electric power distribution device 424 via an RFI filter device 442. Additionally, TestMAC Ethernet port 438 is communicated with an RFI filter device 442 which is further communicated with each of the plurality of Custom MAC devices 426 via an Ethernet switch 444. It will be appreciated that multiple variations for implementing TestMAC module 422 are contemplated, for example one way might include utilizing Ethernet port 438 on TestMAC module 422, but not involve an Ethernet switch 444. Each of the plurality of Custom MAC devices 426 is communicated with one of the plurality of TestMAC Modem/Baseband devices 428, wherein each of the plurality of Custom MAC devices 426 and each of the plurality of TestMAC Modem/Baseband devices 428 are communicated with one of the plurality of TestMAC radio transceivers 430. Furthermore, each of the plurality of TestMAC radio transceivers 430 are communicated with at least one of the plurality of TestMAC RF ports 440 via user-accessible TestMAC RF connectors 446.

It will be appreciated that it is also possible to operate more than two Custom MAC devices 426 in the same TestMAC module 422 using a fairly straightforward process. The Ethernet interfaces from each Custom 802.11 MAC device 426 are simply multiplexed through TestMAC Ethernet port 438 and the RF connectors 446 are combined within TestMAC module 422 in order to reduce the number of RF ports to the two available on the backplane. Additionally, the collision sync signals are simply connected in a ring so that the output from one Custom MAC device 426 is connected to the input of the next Custom MAC device 426. This scheme allows for a sophisticated collision scenario among multiple Custom MAC devices 426, if desired. However, for the purpose of causing a collision between two radio entities, two Custom MAC devices 426 are sufficient.

The RF Port Module (RFPM) 448 is the key to expandability in test system 100. RFPM 448 may be installed in a single slot of the plurality of module connectors 146 and provide the means for flexible attachment of AP's 102 as Devices Under Test (DUT's) as well as additional test systems 100. A whole system chassis 200 may be filled with RFPM's 448 in order to provide for large-scale aggregation of wireless LAN systems for testing features that require coordinated operation of wireless LANs, such as roaming.

Figure 13:
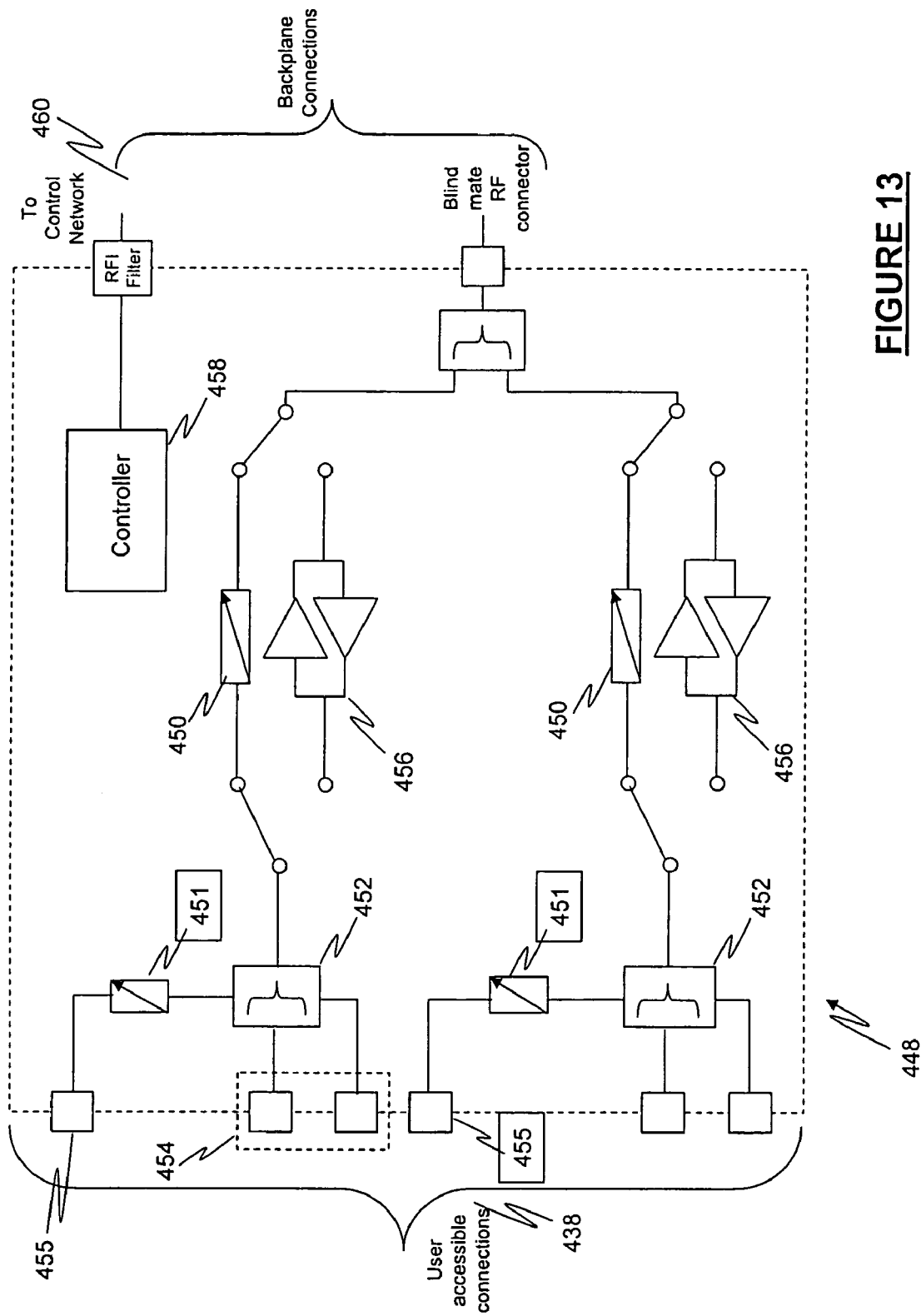
FIG. 13 shows a functional block diagram of an RF Port Module.

Referring to FIG. 13, an RFPM 448 is shown and includes a plurality of programmable attenuators 450 for precisely adjusting signal levels, power splitter/combiners 452 for providing expansion ports 454, and switch-selectable bidirectional amplifiers 456 to provide additional signal gain when a completely passive system is no longer scalable. It should be noted that power splitter/combiners 452 are further communicated with an RF test head connector 455 via programmable attenuators 451 to advantageously allow for multiple test heads to be connected to RFPM 448. Programmable attenuators 450, 451 may be adjusted and switch-selectable bidirectional amplifiers 456 may be selected via an onboard controller 458 which is attached to the system control network 460. It will be appreciated that RFPM 448 may support multiple independent channels of RF signals.

It will be appreciated that the test system 100 further includes a synchronization circuit disposed in system chassis 200 that provides a sync signal to each component within system chassis 200 and that are connected to backplane 212. This advantageously acts to resynchronize a counter internal to each system chassis 200 to a specific, high precision count value. Typically, the sync signal is provided to each component within system chassis 200 every 100 microseconds. However, it is contemplated that the sync signal may be provided to components within system chassis 200 at any timing rate suitable to the desired end purpose, such as every 100 nanoseconds. It is also contemplated that multiple system chassis's 200 may be employed and that a master sync signal may be provided to resynchronize counters internal to each system chassis 200. Master sync signal may be provided via a device that is externally and/or internally resident to system chassis 200.

Additionally, test system 100 includes a control network and a control processing device, wherein the control network is preferably a 100BASE-TX network which connects each test module to the control processing device and which provides control and coordination for all components in test system 100. It will be appreciated that the control network advantageously allows for the test and/or measurement data taken during a test procedure to be retrieved and communicated to the control processing device for processing. The control processing device is preferably a Personal Computer (PC) and is disposed external to test system 100 and includes the capability to configure, control and run all tests conducted by test system 100. A software application operating on the PC operates under the control of a user such that the user may select a test configuration, allow parameters to be entered and edited and, once the user is satisfied with the test, allows the user to configure various elements of test system 100 as well as to orchestrate the test. It is contemplated that this software application may also collect test and/or measurement data and communicate this data to the user is a predetermined and modifiable format.

It will further be appreciated that test system 100 will provide EM shielding which is sufficient such that multiple test systems 100 may be operated in close proximity with each other without experiencing test anomalies due to electromagnetic interference. This is clearly advantageous with IEEE 802.11(b) systems because they typically only have three channels available. For example, consider the testing of a roaming system under unshielded conditions (both unshielded test chassis and test cables). To conduct a roaming test properly, three channels are preferred (although it can be performed with two channels, three channels provides better results). However, if all three channels are being used by a single device under test using traditional over-the-air methods, other systems being operated nearby may induce electromagnetic interference into the test system. As such, no other systems may be operated (for any purpose) during the test. Thus, it will be appreciated that it is advantageous to not only shield each test system, but to shield each module contained within the system. This is necessary in order to provide sufficient electromagnetic isolation between multiple test systems as well as multiple test modules.

As an example of the importance of electromagnetic isolation, consider the antenna ports of two wireless NIC's 226. With a maximum transmitted RF power of 23 dBm and a minimum sensitivity of −82 dBm, the isolation between the antenna ports of wireless NICs 226 must exceed 105 dB on unintentional transmission paths (i.e., leakage). Without this isolation, it is possible that the minimum signal received by one of the wireless NIC's 226 may be determined not by the programmable attenuators, but by signal leakage. This is undesirable because receiver input levels must be settable through programmable attenuators for the virtual positioning capability to work over the entire intended range. It will be appreciated that there are multiple types of RF isolation: isolation regarding individual system isolation (i.e. isolation from the outside world) and isolation regarding test system to test system. The former is necessary to avoid outside interference and to enable test systems to work side by side. The latter is necessary to enable accurate virtual positioning.

It is contemplated that test system 100 may be configured in a variety of ways, using one or more test chassis's 200 to construct the desired wireless topology. To take full advantage of the test environment, a topology system map must be generated within the system software to represent the topology as constructed, in a process referred to as "system discovery." Unfortunately, however, a manual system discovery process is time consuming and prone to errors. Thus, it would be advantageous for the system discovery process to be performed automatically. The system discovery process includes determining the contents of any single chassis 200 and the connections between multiple chassis's 200. It will be appreciated that determining the contents of any single chassis 200 is relatively simple because the means for identifying installed modules has been designed into the system in the standard way. However, determination of the RF cabling connections between multiple chassis's 200 is a much more open-ended problem because of the flexibility the user has in connecting the cables.

Figure 14:
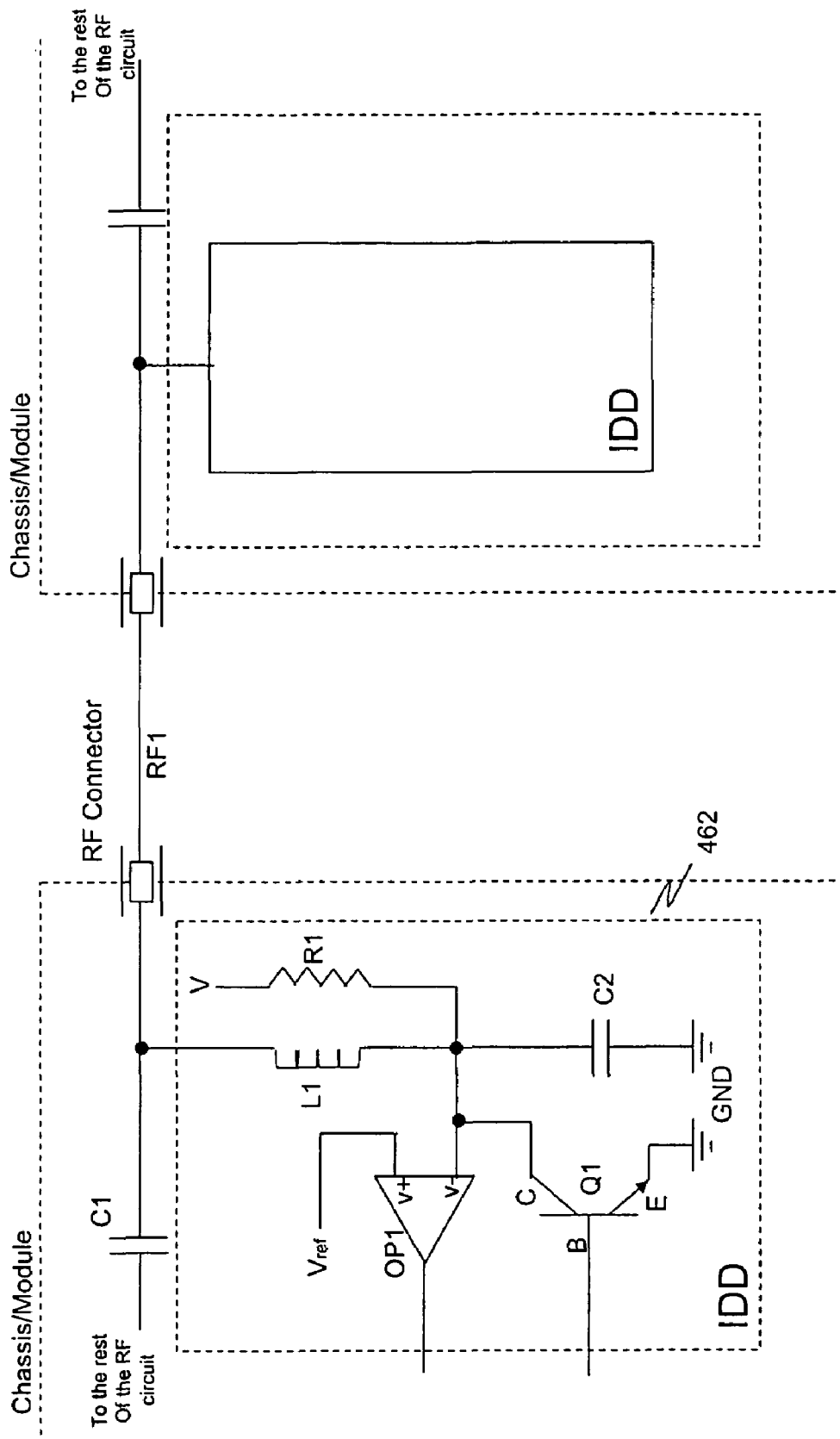
FIG. 14 shows a simplified schematic block diagram of an interconnection discovery device communicated with multiple test chassis.

In order to simplify this process, test system 100 may include an interconnection discovery method and an Interconnection Discovery Device (IDD) 462 for RF interconnection discovery. IDD 462, used in conjunction with the interconnection discovery method, advantageously and unambiguously maps all the RF connections to test system 100. FIG. 14 depicts a simplified schematic block diagram of multiple test chassis's 200 and an IDD 462. The left side of the diagram shows a single RF port 464 on a test chassis 200 or module. The right side shows a similar test chassis 200 or module with the same type of IDD 462. They are connected by an RF transmission line RF1, typically a shielded coaxial cable. The idea is to allow sensing the presence of a small current flowing between any RF ports 464 on one or more chassis 200, thereby indicating the presence of the cable. By turning the current on and off, software running in the console can determine which two ports are connected.

Referring to FIG. 14, an IDD 462 is shown and includes RF transmission line RF1, a capacitor C1, a capacitor C2, an inductor L1, a resistor R1, a transistor Q1 and a comparator OP1 having a comparator output Vo, a positive input V+ and a negative input V−. Capacitor C1 is preferably a DC blocking capacitor which is disposed in series connection with RF transmission line RF1 in order to provide isolation between IDD 462 and the RF components inside test chassis 200 or the test modules. This advantageously allows RF signals at the frequencies of interest to pass, but filters out any DC component on RF1. Inductor L1 is connected between RF1 and negative input V− of comparator OP1 and provides an RF impedance sufficient to minimize the RF insertion loss caused by the insertion of IDD 462 into test system 100, but which allows DC signals to pass. Resistor R1 is connected between negative input V− of comparator OP1 and a positive voltage source V and provides a DC bias to IDD 462, which is conducted to the far end of any RF cable attached to an RF port. Capacitor C2 is connected between negative input V− of comparator OP1 and a system ground GND and provide a path to ground for any RF signal leaking past inductor L1. This advantageously keeps the RF signal from leaking onto the DC power supply.

Transistor Q1 is preferably an NPN transistor having an emitter E, a collector C and a Base B, wherein E is connected to system ground GND and C is connected to negative input V− of comparator OP1. Positive input V+ of OP1 is connected with a reference voltage source Vref which is set to approximately one half of the voltage of positive voltage source V. When Base B is forward biased, transistor Q1 brings the RF signal conductor close to system ground potential GND and comparator OP1, sensing the drop in voltage, changes its output state at Vo. This drives a logic level within interface circuitry that passes the state change at Vo on to the console program.

It will be appreciated that this is not the only possible embodiment of the IDD 462. For example, by exchanging Q1 and R1, and making Q1 a PNP transistor, the RF conductor is at ground potential unless the transistor is turned on. This simply inverts the logic required to detect the cable presence. It should also be noted that transistor Q1 may be part of a logic gate. Such gates are known as having an open collector output which would be very suitable for IDD 462. In addition, other types of transistors or switching devices are also possible. For instance, a MOSFET or FET may be substituted or a mechanical switch could also be used.

It will be appreciated that the IDD 462 may be attached to every RF port and may be configured to receive or transmit a signal. However, under normal operating conditions IDD 462 is configured to receive signals, wherein IDD 462 may be operated as follows. When test system 100 needs to update the system map, a control program running on the console system begins stepping through every RF port, activating each IDD 462. If the activated RF port is connected to another RF port, the IDD 462 on the remote port will detect a current flow. Because there is only a single other RF port activated in the system, this establishes that there is a connection between the two RF ports. The control program then deactivates the IDD 462 in the current RF port and moves on to other RF ports in the system that have yet to be tested, thereby establishing the external RF connectivity of all devices.

It will be appreciated that in many test situations, it is desirable to be able to record all traffic observed on the airlink for analysis and playback. For example, consider the closely-related activities of compliance and interoperability testing. Compliance testing involves verifying that a single wireless device adheres to a standard, whereas interoperability testing determines whether two or more wireless devices can work together properly. To gain the most from such testing, an ability to monitor the actual airlink traffic is necessary and advantageous. Thus, it is contemplated that a vendor-supplied wireless NIC may be used as an Distributed Airlink Monitor (DAM). It is also contemplated that one or multiple DAM's may be employed to monitor and/or record a single or multiple channels depending upon the test requirements. This monitor NIC preferably includes the ability to capture and record all traffic observed on a single radio channel for later playback and analysis. The monitor NIC also includes features such as one might find in a traditional logic analyzer or network packet capture software, such as time stamping, triggering on an event, traffic filtering, etc. This advantageously enables complex airlink scenarios to be debugged, including rate adaptation, security transactions, QoS negotiations and delivery of service, as well as many other situations. It should be further stated that the DAM may be composed of a plurality of wireless NIC's (i.e. monitor NICs) disposed throughout test system 100, and may include analysis software resident within test system 100 or any other suitable location (e.g. console) that collects and processes all information gathered by the monitor NICs.

It will be appreciated that this type of configuration may be useful when a test system is configured to simulate several BSS's, such as discussed hereinbelow. A monitor NIC is preferably installed in each test chassis 200 and programmed to monitor the channel on which the AP 102 is operating. Because the monitor NIC does not transmit, there is no possibility that the monitor NIC will overdrive other devices with a strong signal. Hence, the programmable attenuator within CM 210 can be set to provide a generous signal level from all wireless devices 104 in the BSS. The key in this scenario is to set the attenuator so the monitor NIC may receive signals from stations disposed far away at the maximum data rate, while also preventing signal overloading from the wireless device 104 under test in the same CM 210. The synchronization infrastructure built into the test system 200 may also allow for global timestamps to be assigned to each frame received by the monitor NIC and with monitor NICs assigned to each channel operating in the test system 100, complex roaming scenarios may advantageously be simulated and analyzed.

It will be appreciated that a user-selected wireless NIC may be installed in one slot 252 of the CM 210 as a device under test (DUT) NIC and a vendor-supplied wireless NIC may be installed in the other slot 252 as a monitor NIC. In this configuration, the monitor NIC receives a sufficient amount of signal power from the DUT NIC so that all frames transmitted by the DUT NIC may be correctly received at the monitor. It should be noted that for some settings of the programmable attenuators it may be possible that not all frames received at the DUT will be successfully received by the monitor NIC. However, with a monitor NIC present next to every DUT NIC, it may be possible to collect and collate traffic data from each monitor NIC and recreate the entire airlink transaction. Additionally, the global timestamp capability advantageously allows a timestamp to be assigned to each frame received by the monitor NIC, thus giving the distributed monitoring system an omniscient view of a wireless LAN. This omniscient viewpoint will advantageously allow for true collision detection to occur.

Typically, the only information one has when a collision occurs is that a frame was received in error. If two or more DUT NICs transmit at the same time, the monitor NIC is almost guaranteed to receive the DUT signal in spite of the collision because it is so strong at the monitor NIC and the timestamp on each received frame will show that both frames were transmitted at the same time, hence proving a collision occurred. It is contemplated that the distributed monitoring system may also detect hidden stations. This may be accomplished by noting that one or more DUT NICs do not "hear" another DUT NIC simulated to be further away. This is helpful both for removing such situations from a test configuration, if it is not desired, and for making sure a DUT introduced as a hidden station for test purposes is in fact a hidden station.

Turning now to FIGS. 15–20, multiple configurations of test system 100 are shown and discussed. It will be appreciated that the test system configurations discussed below are not intended to represent all of the possible test system configurations and thus is not intended to limit the possible configurations to those discussed herein.

Figure 15:
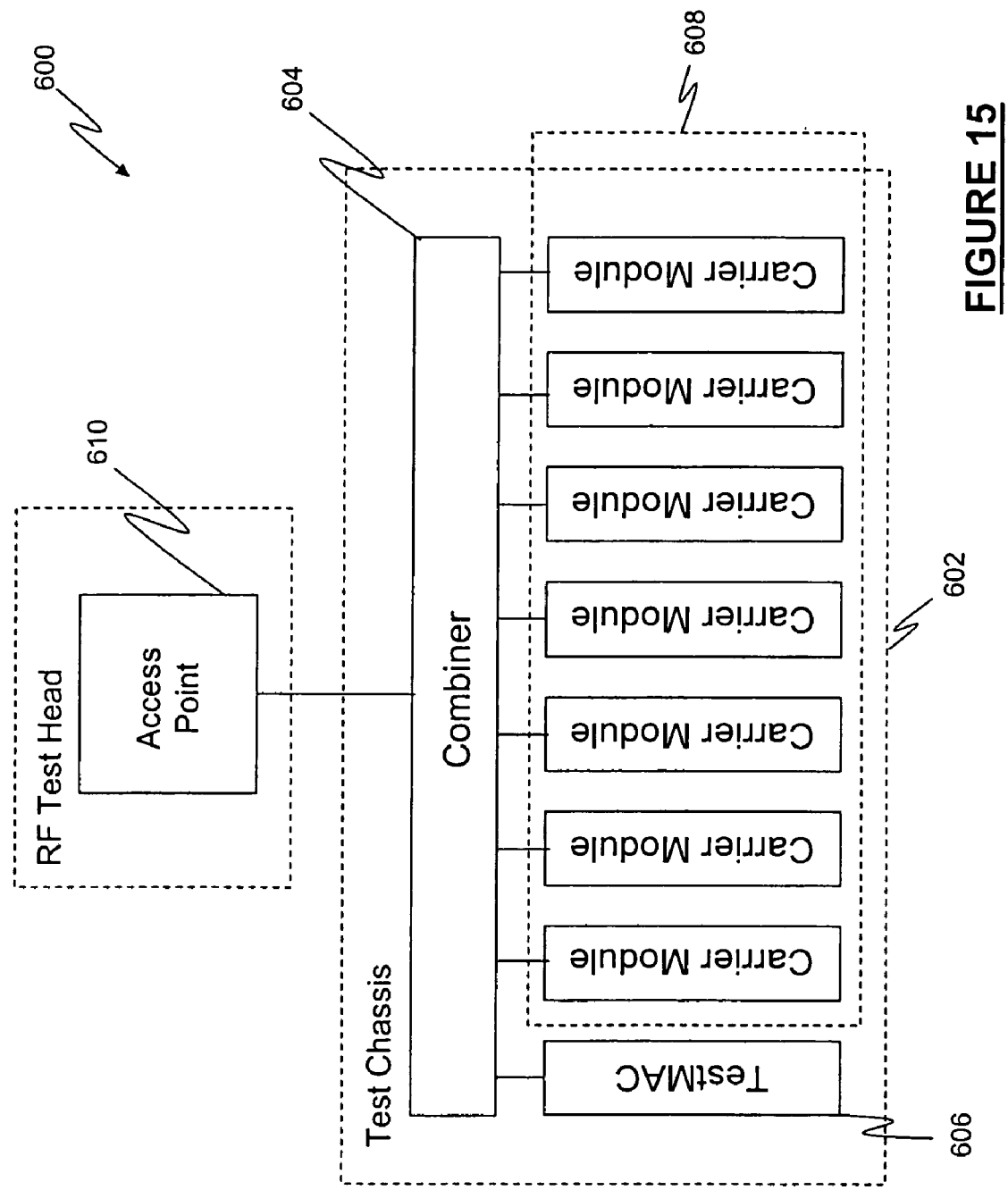
FIG. 15 shows a functional block diagram of a first embodiment of a test system.
Figure 16:
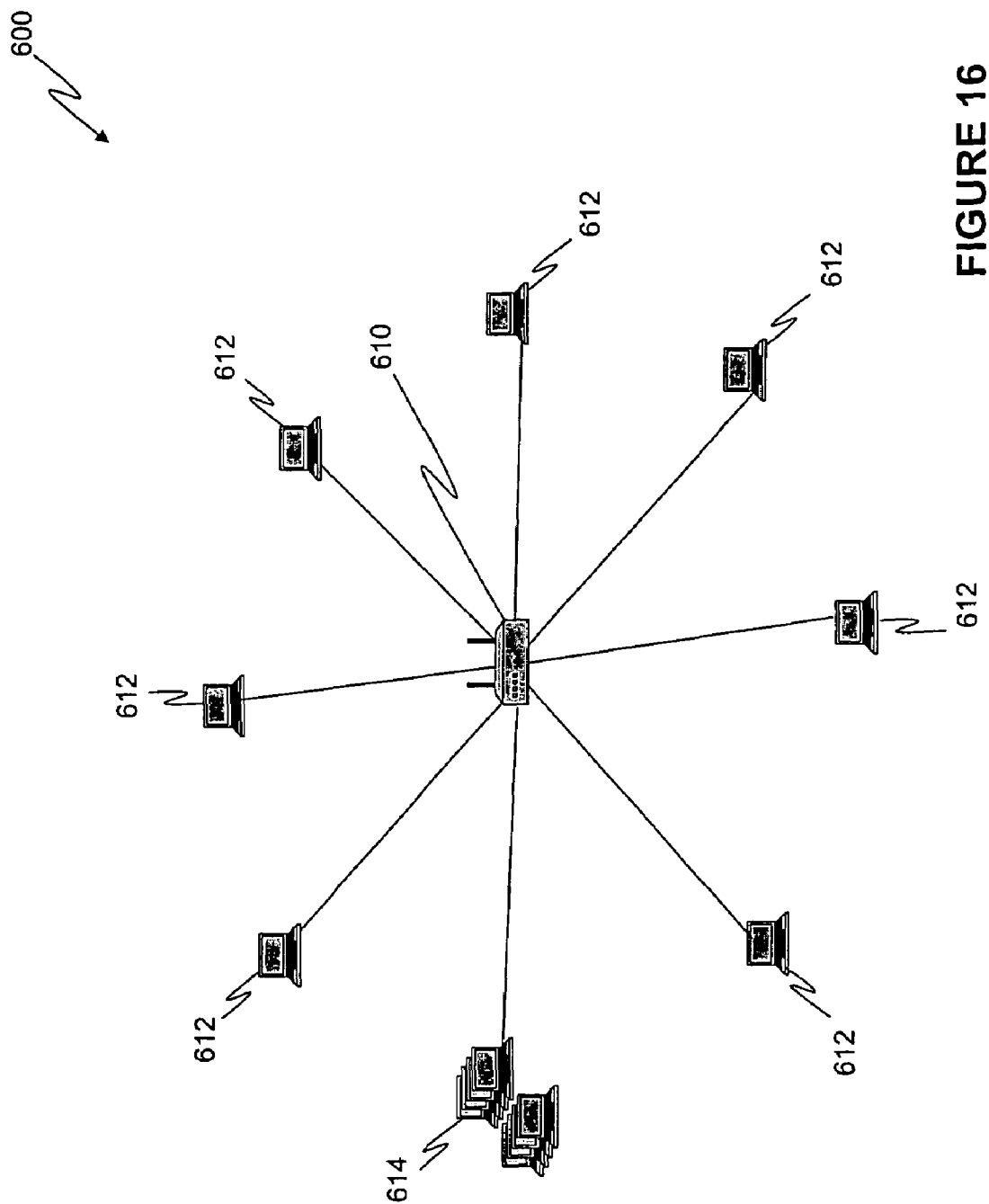
FIG. 16 shows a conceptual block diagram of a first embodiment of a test system.

Referring to FIG. 15 and FIG. 16, a functional block diagram and a conceptual block diagram of a first embodiment of a test system 600 are shown, respectively. Test system 600 includes a test chassis 602 having an RF combiner 604, a TestMAC module 606 and a plurality of CM's 608, wherein TestMAC module 606 and plurality of CM's 608 are communicated with RF combiner 604. RF combiner 604 is communicated with an access point 610 which is further communicated with a plurality of wireless clients 612. It will be appreciated that, in this configuration, there are shown seven CM's 608 and seven wireless clients 612, wherein each of the seven CM's 608 is associated with only one of the seven wireless clients 612 and that each CM 608 is only half populated by wireless NICs in order to simplify the explanation.

Additionally, referring to FIG. 16, a 'group' of multiple wireless clients 614 are shown as being representative of TestMAC module 606, wherein TestMAC module 606 is configured as a TestMAC module 606, 422. As previously discussed, TestMAC module 606 may be configured to represent a predetermined number of wireless clients 612. It can be seen that the connection to RF combiner 604 and access point 610 is provided through test chassis 602.

Figure 17:
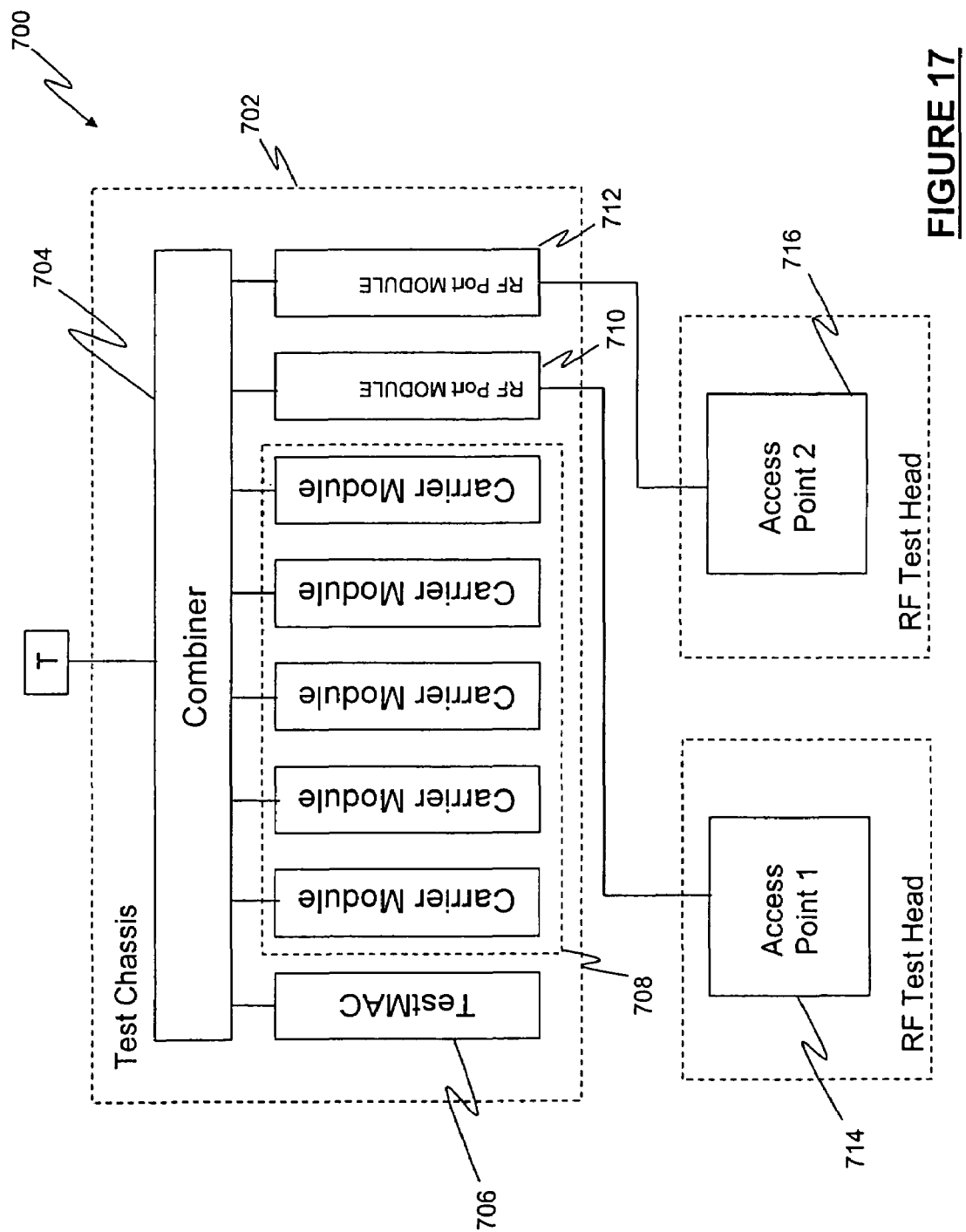
FIG. 17 shows a functional block diagram of a second embodiment of a test system.
Figure 18:
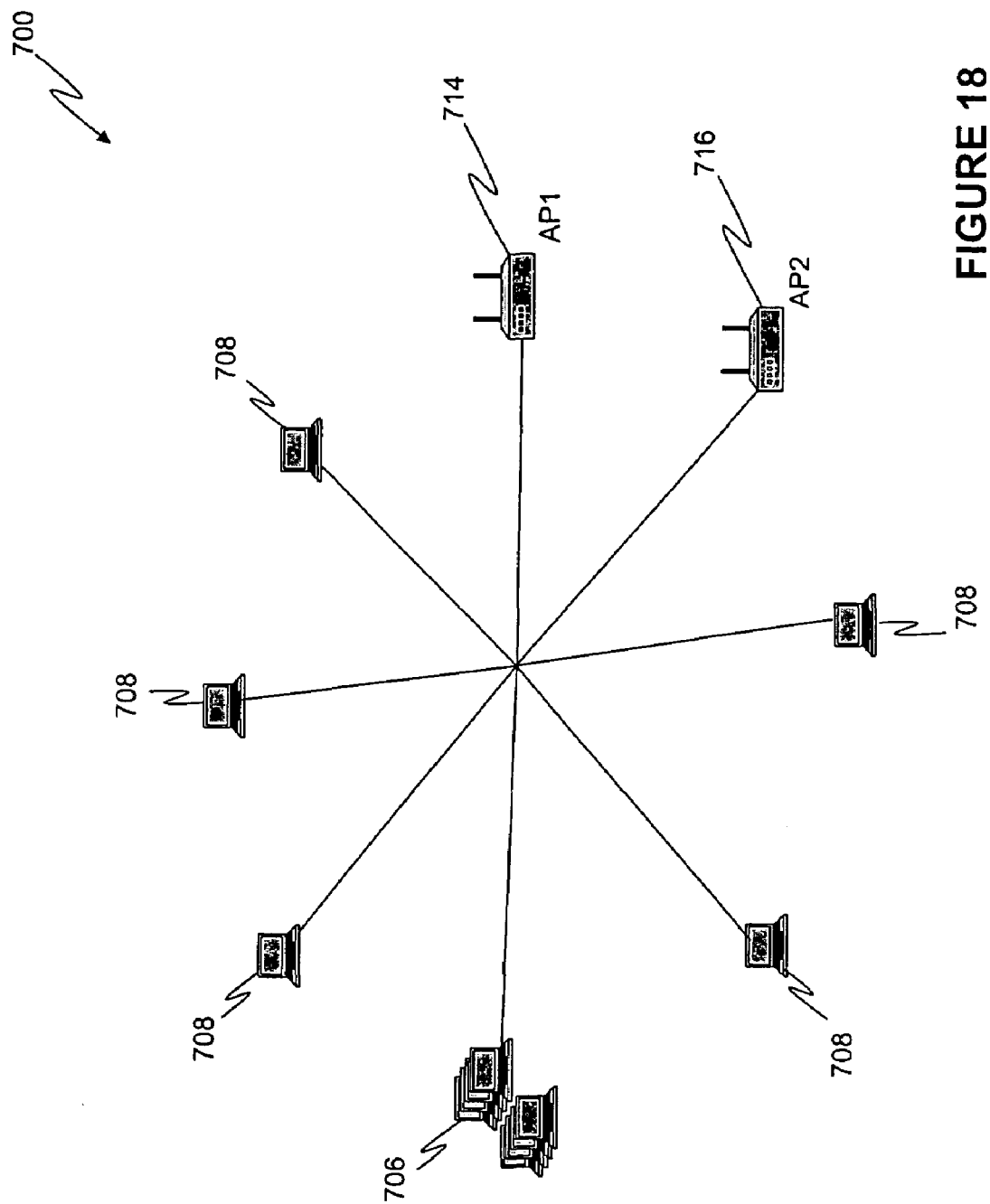
FIG. 18 shows a conceptual block diagram of a second embodiment of a test system.

Referring to FIG. 17 and FIG. 18, a functional block diagram and a conceptual block diagram of a second embodiment of a test system 700 are shown, respectively. Test system 700 includes a test chassis 702 having an RF combiner 704, a TestMAC module 706, a plurality of CM's 708, a first RFPM 710 and a second RFPM 712, wherein TestMAC module 706, plurality of CM's 708 and first and second RFPM' 710, 712 are communicated with RF combiner 704. Test system 700 also includes a first access point 714 communicated with first RFPM 710 and a second access point 716 communicated with second RFPM 712. It will be appreciated that first access point 714 and second access point 716 are connected to first RFPM 710 and second RFPM 712, respectively, through the RF test head connector 455.

It will be appreciated that this configuration advantageously permits a simple roaming scenario to be tested in which the wireless NICS, having first been associated with first access point 714 are all caused to roam to second access point 716. This may be accomplished by first setting the programmable attenuators so that the reception between first access point 714 and the wireless NICs is most favorable, then changing the attenuators in the access point paths so that reception with second access point 716 also becomes most favorable. A similar test may be performed in which second access point 716 is powered on shortly before first access point 714 is powered off. This will advantageously cause a 'mass migration' of clients to second access point 716, the effect of which will cause significant stress levels on the mechanisms within second access point 716 that handle the IEEE 802.11 association process.

Figure 19:
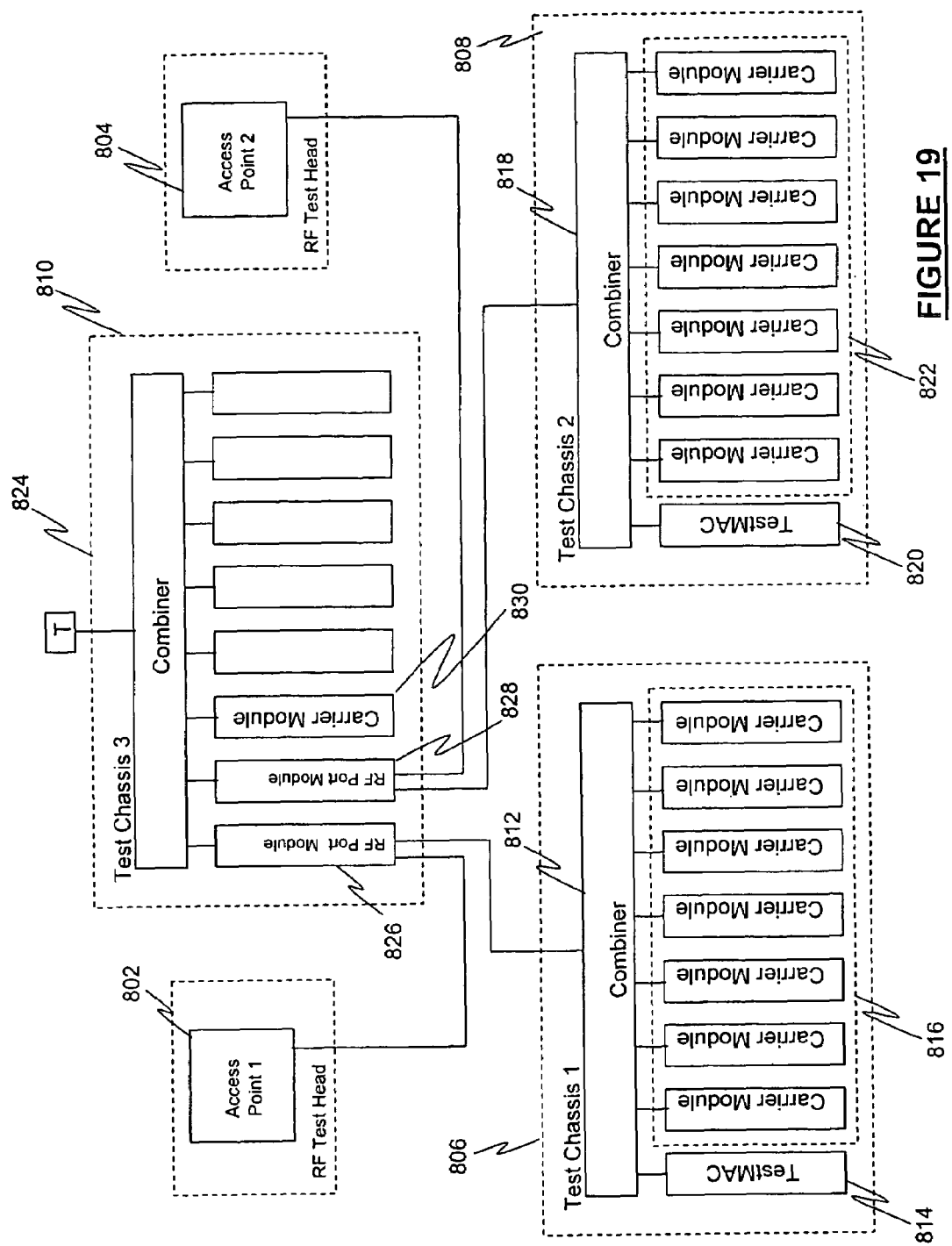
FIG. 19 shows a functional block diagram of a third embodiment of a test system.
Figure 20:
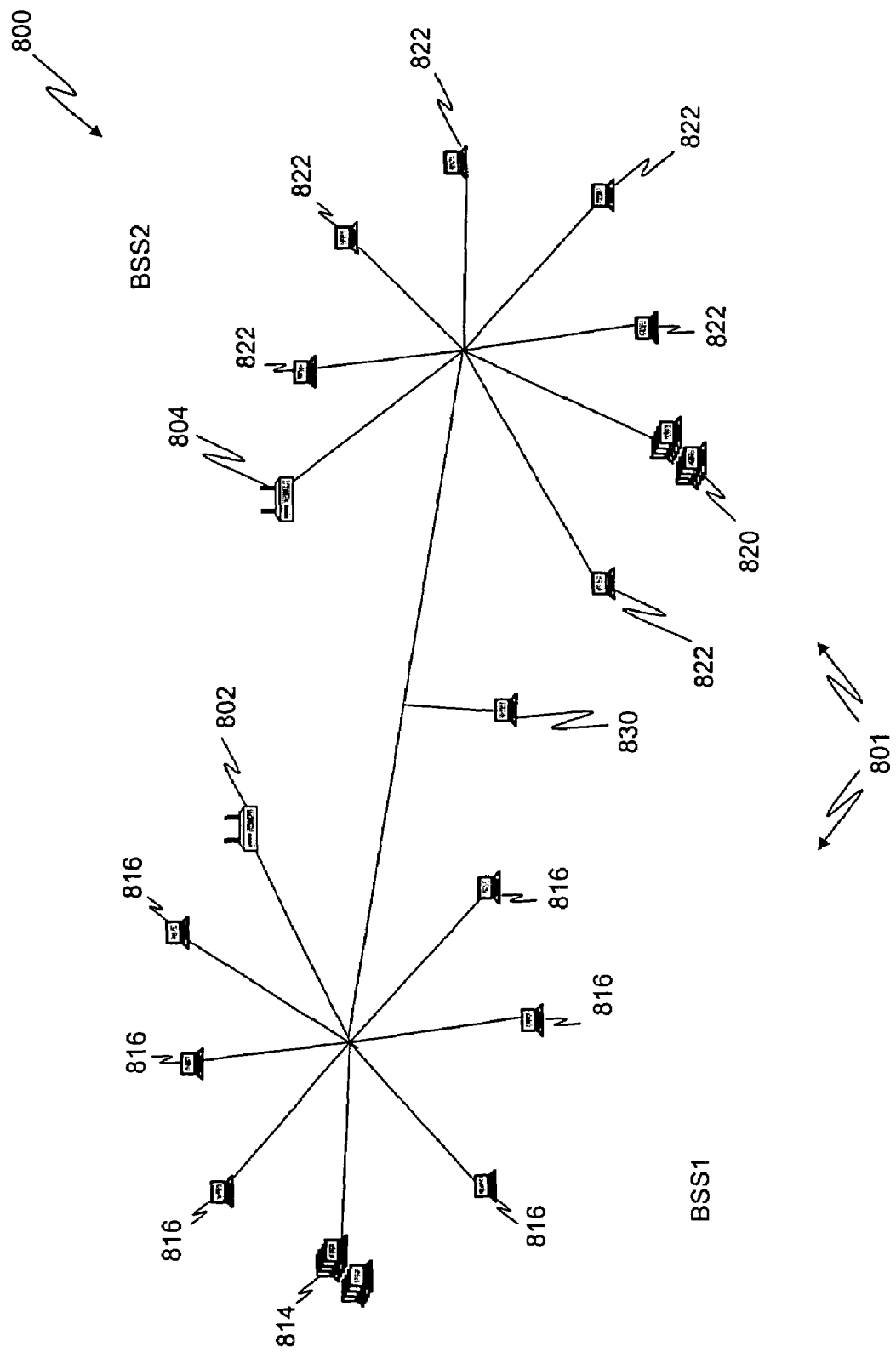
FIG. 20 shows a conceptual block diagram of a third embodiment of a test system.

Referring to FIG. 19 and FIG. 20, a functional block diagram and a conceptual block diagram of a third embodiment of a test system 800 are shown, respectively and depicts two Basic Service Sets (BSS) 801, each of which includes a wireless access point 102 and a plurality of wireless clients 104. Test system 800 includes a first access point 802, a second access point 804, a first test chassis 806, a second test chassis 808 and a third test chassis 810, wherein first test chassis 806, second test chassis 808 and third test chassis 810 are connected in a hierarchical manner and wherein first test chassis 806 and second test chassis 808 represent the two BSS's 801.

First test chassis 806 includes a first RF combiner 812 communicated with a first TestMAC module 814 and a plurality of first CM's 816, second test chassis 808 includes a second RF combiner 818 communicated with a second TestMAC module 820 and a plurality of second CM's 822 and third test chassis 810 includes a third RF combiner 824 communicated with a first RFPM 826, a second RFPM 828 and a third CM 830. It should be noted that first RFPM 826 and second RFPM 828 are being utilized as RF expansion modules and are connected to third test chassis 810 via the RF expansion port on each RFPM 826. It is contemplated that the connection between the two BSS's 801 allows stations in one BSS 801 to potentially receives the stations in the other BSS 801. It is further contemplated that the wireless client 830 in FIG. 18 is one that may be associated with either BSS 801, depending on its virtual position. It is further contemplated that first access point 802 is connected to a first AP test head 832 via RF test head connector 455 on first RFPM 826 and that second access point 804 is connected to a second AP test head 834 via RF test head connector 455 on second RFPM 828.

Third CM 830 includes a single client NIC which is preferably configured to simulate a roaming wireless client, as shown in FIG. 15. It will be appreciated that by adjusting the programmable attenuators in the RFPM's 826, 828 the single client NIC can be made to 'hear' one access point better than the remaining access point, and hence exercise the wireless client's roaming algorithms. It will be appreciated that while only a single NIC is described as being utilized in third test chassis 810, multiple NIC may be used, each with the same roaming abilities. Thus, using the programmable attenuators in the RFPM's 826, 828 and those provided in the first, second and third CM's 816, 822, 830, a wide variety of roaming scenarios may be simulated using the NIC's in third test chassis 810.

It will be appreciated that when a radio signal is transmitted, the signal typically experiences reflection, diffraction and absorption due to objects disposed in the environment. Additionally, wireless devices may also include directional antennas which further influence the transmitted signals and relative motion between the transmitter and receiver, or motion of objects in the environment, may introduce Doppler shifts on the propagating signal as well. Thus, the overall effect of the environment on a radio signal may be grouped into two parts: path loss and distortion. Path loss represents a gross decrease in the received level of the radio signal from the level that was transmitted and is typically a function of the distance between the transmitter and the receiver, signal absorption through intervening obstacles, and the gain of any antennas in the direction of the direct ray.

Distortion effects are typically caused by multipath and by Doppler shifts. Multipath distortion is caused when reflected waves are received with a multitude of phases and amplitudes and summed by the receiver circuitry. Thus, the fact that some waves are in phase (reinforcing components of the direct signal ray) and some waves are out of phase (canceling components of the direct signal ray) may cause extreme signal distortion. As such, a particular reflected ray is in or out of phase with the direct ray as a function of frequency, hence multipath causes a frequency dependent signal distortion. Additionally, Doppler shift also distorts the radio waves. For example, if there is relative motion between the transmitter, reflectors and the receiver, the transmitted signal may experience a shift in frequency, either shifting higher or lower in frequency, further distorting the signal that is ultimately received.

It will be appreciated that phenomena that causes a change in the overall signal level (antenna gain, propagation loss and signal absorption) may be directly simulated using the programmable attenuators of the test system and as such, any desired scenario involving these effects may be simulated. For example, consider a typical wireless LAN transmitter and receiver situation. Each station may have a directional antenna, and the direct path between the two may be blocked by a wall or other obstruction. Appropriately setting a programmable attenuator for this scenario means (a) estimating the path loss between the two stations, (b) estimating the attenuation caused by the wall, and (c) computing the gain, relative to the antenna input port, of the antennas in the appropriate directions for each station.

Figure 21:
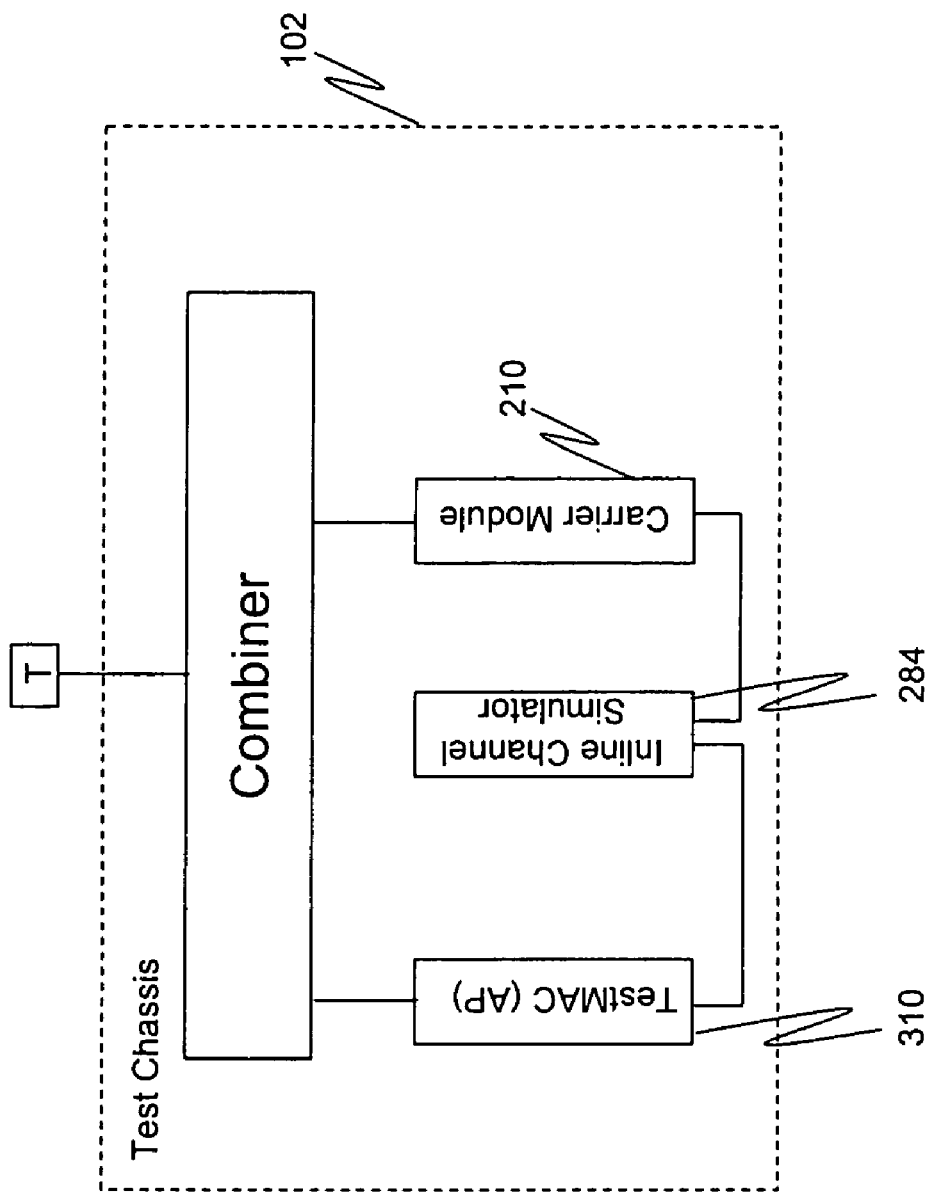
FIG. 21 shows a carrier module configured to operate a single NIC and an inline channel simulator module.

Once these values have been determined, the overall signal loss between the transmitter and receiver may be estimated by summing the individual losses, in dB. This advantageously produces the correct setting of the programmable attenuator between these wireless stations. In order to account for multipath and Doppler distortion, an external channel simulator may be connected, or an ICSM 284 may be used. For example, one possible configuration using the test system includes a TestMAC which is configured to simulate an Access Point. Referring to FIG. 21, a CM 210 is configured to operate a single NIC and an ICSM 284 may be installed in the chassis 200, although the ICSM 284 has no connection to the RF backplane. TestMAC 310 and CM 210 are configured to route the RF signal to a user-accessible connection, wherein external cabling provides the connections between the TestMAC 310, CM 210 and ICSM 284.

Turning now to FIG. 22, a block diagram describing a method of simulating traffic in a wireless network 900 is shown and discussed. As shown in block 902, a modulator/demodulator component is provided wherein the modulator/demodulator component is disposed to be in communication with a transceiver component. It will be appreciated that the transceiver component is capable of transmitting and receiving RF signals in the wireless network. A plurality of virtual clients are then created as shown in block 904, wherein the virtual clients are connected with the modulator/demodulator. Additionally, the virtual clients transmit and receive data frames in the wireless network in compliance with a selected wireless communications standard and wherein the virtual clients maintain individual state for communication protocol as required by the selected wireless communications standard.

It will be appreciated that the shielded enclosures and cables may be shielded using any shielding device suitable to the desired end purpose, such as a copper and/or aluminum enclosure and/or copper and/or aluminum mesh material. Moreover, it is contemplated that other shielding techniques may be employed as well, such as the use of ground planes, ferrites, etc. It is also contemplated that various known shielding materials and methods may be used singly or in combination with each other.

As described above, the method 900 of FIG. 22 may be embodied in the form of computer-implemented processes and apparatuses for practicing those processes. The method 900 of FIG. 22 may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Existing systems having reprogrammable storage (e.g., flash memory) may be updated to implement the invention. The method of FIG. 22 may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. An RF module for testing an RF device under test in a test environment, said test environment emulating a wireless environment; said RF module comprising:
    at least one RF isolation chamber, said RF isolation chamber including a connection port to connect to said RF device under test located within said RF isolation chamber, said connection port including connections so that a connected RF device under test is in RF connection with an adjustable attenuation component, and wherein said adjustable attenuation component is in RF connection with an RF port on said RF module;
    an RF device controller, in communication with said RF device under test, said RF device controller to control said connected RF device under test.

2. The RF module of claim 1 wherein said connected RF device under test includes a second RF connection; and said connection port includes connections so that said second RF connection on said connected RF device under test is in RF connection to a second adjustable attenuation component, said second adjustable attenuation component in RF connection with said RF port through an RF combining component.

3. The RF module of claim 1 wherein said RF port on said RF module allows interconnection to an RF combining component, said RF combining component to combine RF signals from other RF devices.

4. The RF module of claim 3 wherein said RF port on said RF module is electrically connected to a DC signal detector, to detect DC signals emanating from other RF modules interconnected with said RF combining component.

5. The RF module of claim 4 further including a DC signal injector electrically connected to said RF port on said RF module.

6. The RF module of claim 1 wherein said RF isolation chamber contains RF signals emanating from said connected RF device under test.

7. The RF module of claim 1 wherein said RF isolation chamber isolates said connected RF device under test from outside RF signals and noise.

8. The RF module of claim 1 wherein said connection port includes RF isolation shielding to contain RF signals emanating from a connected RF device under test.

9. The RF module of claim 1 further including a plurality of RF signal access locations to provide access to RF signals at each of said plurality of RF signal access locations.

10. The RF module of claim 9 wherein said plurality of RF signal access locations allow injection of RF signals at said RF signal access locations.

11. The RF module of claim 1 wherein said RF module receives a system synchronization signal for use in processing received data from said connected RF device under test.

12. The RF module of claim 1 wherein said RF module is detachably mountable within an RF isolation chassis, wherein said RF port on said RF module connects to an RF combining component within said RF isolation chassis, said RF combining component combining RF signals from said RF module and at least one other RF device.

13. A test module, for use in a RF test environment, comprising:
    an RF port to connect to said RF test environment;
    an adjustable attenuation component in RF connection with said RF port;
    an RF modulator/demodulator component, in RF connection with said adjustable attenuation component;
    a virtual client emulator, to emulate a plurality of virtual clients that are transmitting RF signals in said RF test environment;
    wherein said virtual client emulator is in communication with said RF modulator/demodulator component to allow said plurality of virtual clients to transmit RF signals into said RF test environment.

14. The test module of claim 13, wherein said virtual client emulator includes:
    a receive filter and distributor (RFD) component, to process data frames received from said RF test environment; and
    a transmit arbitrator component, to process and transmit data frames to said RF test environment.

15. The test module of claim 13 wherein said transmit arbitrator component creates data frames that are invalid in accordance with a selected protocol for said RF test environment.

16. The test module of claim 14 wherein said transmit arbitrator component creates data frames with incorrect checksums.

17. The test module of claim 14 wherein said transmit arbitrator component transmits a data frame at a time when another device is transmitting data in said RF test environment, in order to cause a collision.

18. The test module of claim 13 wherein said adjustable attenuation component changes attenuation based on a selected virtual client transmitting RF signals into said RF test environment.

19. The test module of claim 13 wherein said adjustable attenuation component changes attenuation for certain data frames being transmitted into said RF test environment.

20. The test module of claim 13 wherein said test module receives data frames from a wired data packet network, and said test module transmits said received data frames in said RF test environment.

21. The test module of claim 13 wherein said test module is detachably mountable within an RF isolation chassis, wherein said RF port on said test module connects to an RF combining component within said RF isolation chassis, said RF combining component combining RF signals from said test module and at least one other RF device.

22. The test module of claim 21 and wherein said RF port is detachably connectable to an RF combining component, said RF combining component combining RF signals from said test module and at least one other RF device.

23. A method of emulating traffic in an RF test environment, comprising:

providing a modulator/demodulator component, said modulator/demodulator component transmitting and receiving in said RF test environment;

providing a virtual client emulator in connection with said modulator/demodulator component, wherein said virtual client emulator creates a plurality of virtual clients that transmit and receive data frames in said RF test environment through said modulator/demodulator component, and wherein said virtual client emulator maintains information regarding such data frames for each virtual client.

24. The method of claim 23 wherein said virtual clients transmit and receive data frames in compliance with a selected wireless communications standard.

25. The method of claim 23 wherein when at least one virtual client is transmitting data frames into said RF test environment, a signal strength of an RF signal being transmitted from said modulator/demodulator component into said RF test environment is reduced.

26. The method of claim 23 further including providing transmission arbitration for said plurality of virtual clients.

27. The method of claim 26 wherein said transmission arbitration includes an ability to transmit at a time to create an on-air collision with another device transmitting in said RF test environment.

28. The method of claim 23 further including transmitting in said RF test environment data that is invalid according to a communication protocol.

29. The method of claim 23 further including transmitting in said RF test environment data with invalid checksums.

30. The method of claim 23 wherein said modulator/demodulator component is in RF connection with an RF combining component, said RF combining component combining RF signals from a plurality of RF devices.

31. A method for testing a roaming feature of a wireless device, said method comprising:

isolating said wireless device in an RF isolation chamber;

providing a first and second access points, wherein each access point is in RF connection with said wireless device by a shielded RF path to an RF combining component, said RF combining component in RF connection with said RF isolation chamber;

establishing RF communications between said wireless device and said first access point over one of said shielded RF paths;

attenuating an RF signal on said shielded RF path between said RF combining component and said first access point;

monitoring said wireless device as said wireless device establishes RF communication with said second access point over said shielded RF path to said second access point.

32. The method of claim 31 wherein said step of monitoring said wireless device includes monitoring RF signals between said wireless device and said access points at locations on said RF shielded paths.

33. The method of claim 31 wherein said step of attenuating an RF signal is performed using a programmable attenuator along said shielded RF path.

34. The method of claim 33 further including:

providing a central controller for controlling a plurality of programmable attenuators, with a programmable attenuator along each of said shielded RF paths.

35. The method of claim 31 wherein said step of monitoring said wireless device includes measuring the time required for said wireless device to establish RF communication with said second access point.

* * * * *